(12) United States Patent
Martin et al.

(10) Patent No.: US 7,409,012 B2
(45) Date of Patent: Aug. 5, 2008

(54) MODULATOR AND SIGNALING METHOD

(75) Inventors: Frederick L. Martin, Plantation, FL (US); Robert E. Stengel, Pompano, FL (US); Edwin E. Bautista, Chesapeake, VA (US)

(73) Assignee: Motorola, Inc., Schaumburg, IL (US)

( * ) Notice: Subject to any disclaimer, the term of this patent is extended or adjusted under 35 U.S.C. 154(b) by 1321 days.

(21) Appl. No.: 10/172,566

(22) Filed: Jun. 14, 2002

(65) Prior Publication Data

US 2003/0016762 A1 Jan. 23, 2003

Related U.S. Application Data

(60) Provisional application No. 60/303,539, filed on Jul. 6, 2001.

(51) Int. Cl.
*H04L 27/20* (2006.01)
(52) U.S. Cl. .............. 375/308; 375/279; 375/280; 375/281; 332/144; 332/146
(58) Field of Classification Search .......... 375/308, 375/279, 280, 281; 332/144, 146; 370/215
See application file for complete search history.

(56) References Cited

U.S. PATENT DOCUMENTS

| 3,983,485 A | 9/1976 | Stuart |
| 4,206,423 A * | 6/1980 | Nossen .................. 332/104 |
| 4,213,094 A * | 7/1980 | Wood ..................... 370/215 |
| 5,825,257 A | 10/1998 | Klymyshyn |
| 6,420,940 B1 * | 7/2002 | Minnis et al. ............. 332/103 |

* cited by examiner

*Primary Examiner*—Phuong Phu

(57) ABSTRACT

Phase shift key modulators (100, 500, 1000, 1400, 1700) are provided in which a multiphase signal source (108, 1402, 1406-1412, 1702) is used to generate a plurality of phases of a carrier signal. A selector (110) is used to select one phase or a sequence of phases of the carrier signal to represent each bit pattern that is received from a binary data source (102, 1422). The multiphase signal source preferably comprises a multiphase oscillator that includes a phase locked ring of variable propagation delay inverters (202). Preferably, a phase sequencer (502) is used to select a monotonic sequence of phases to represent each bit pattern. Preferably two phase selectors (110, 1004) are used to simultaneously select two phases of carrier signal, and a phase interpolator (1106) is used to generate a sequence of phases from the two phases selected by the two phase selectors (110, 1004).

5 Claims, 13 Drawing Sheets

MODULATOR AND SIGNALING METHOD

CROSS REFERENCE TO RELATED APPLICATIONS

This application claims the benefit of U.S. Provisional Application No. 60/303,539, filed Jul. 6, 2001 and assigned to Motorola, Inc.

FIELD OF THE INVENTION

This invention pertains to modulators. More particularly this invention relates to modulators that include phase shift key modulation.

BACKGROUND OF THE INVENTION

Presently there is an interest in developing low cost, highly integrated transceivers. Such transceivers may for example be used in consumer electronic devices such as laptop computers, wireless telephones and personal digital assistants for establishing connectivity between such devices so as to permit interoperability. Alternatively, such transceivers may form a part of so called system-on-a chip devices, which may incorporate sensors, signal processing and communication circuits on a single semiconductor die. One use of systems-on-a-chip is in asset tracking transponders that are affixed to capital equipment to be tracked.

The great increases of late in the use of wireless communication has necessitated increased efforts to conserve and reuse portions of the radio spectrum. Furthermore, given the increase in wireless communication, wireless devices must be designed so as to be able to tolerate increased levels of interference.

Direct Sequence Spread Spectrum (DSSS) has proven to be a spectrum efficient signal method that is capable of operating in high interference communication environments. DSSS is for example used in code division multi-Access (CDMA). In conventional DSSS, a binary data stream consisting of ones and zeros is transformed into a bipolar data signal in which ones are represented by a positive signal level (+1) and zeros are represented by a negative signal level (−1). Such a bipolar data signal is characterized by a data rate. The bipolar data signal is mixed with (multiplied by) a higher rate bipolar spreading code signal that includes bit aligned repetitions of a spreading code. The mixed bipolar signal that results from the mixing operation is used to phase shift key modulate a carrier signal.

A variety of phase shift key modulation techniques are known. One technique that is used in conjunction with DSSS is binary phase shift key (BPSK) modulation. In an exemplary implementation of BPSK for every appearance of one in the mixed bipolar signal a carrier signal is transmitted with zero phase shift, and for every appearance of negative one the carrier is transmitted with a phase shift of Pi radians.

Another technique known as quadrature phase shift key (QPSK) modulation offers twice the data rate of BPSK modulation. In an exemplary implementation of QPSK modulation the mixed bipolar signal is parsed into first and second channel bipolar signals. The first channel bipolar signal is used to BPSK modulate a zero phase (i.e. cosine or in-phase component) of a carrier and the second channel bipolar signal is used to BPSK modulate a Pi/2 phase (i.e. sine or quadrature phase) of the carrier signal. The two BPSK modulated carrier signals are summed before being amplified, filtered and transmitted. Because the two phases of the carrier are orthogonal (sine and cosine being orthogonal), the two channels bipolar signals may be transmitted and recovered without interfering with each other.

In QPSK, there are four possible permutations of the signal values of the first and second channel bipolar signals (00, 01, 10, and 11). The four possible permutations lead to four possible phases when the resulting signals are viewed on a complex plane (or phasor diagram) with the result of the first BPSK operation corresponding to the real axis, and the result of the second BPSK operation corresponding to the imaginary axis. One drawback of QPSK is that simultaneous signal level transitions in the first and second channel bipolar signals will result in a Pi radian jump in the phase of the transmitted signal. Such a large abrupt jump in phase can lead to undesirable out of band signal components.

Another phase shift key signaling technique that is a modification of the QPSK method is known as offset quadrature phase shift key (OQPSK). OQPSK addresses the problems caused by large abrupt phase jumps by offsetting the first and second channel bipolar signals so that only one changes signal level at a time, and consequently phase jumps are limited to Pi/2 radians. OQPSK is useful to some extent in reducing out of band signal components.

Aside from the matters of increasing interference tolerance, and reducing the generation of interference, another matter that must be addressed in order to foster the proliferation of wireless connectivity in electronic devices is the cost of modulators. Unfortunately, traditional transmitters that implement phase shift key modulation, use analog mixers to mix baseband signals with one or more phases of a carrier signal in order to phase shift the carrier.

BRIEF DESCRIPTION OF THE DRAWINGS

The features of the invention believed to be novel are set forth in the claims. The invention itself, however, may be best understood by reference to the following detailed description of certain exemplary embodiments of the invention, taken in conjunction with the accompanying drawings in which:

DETAILED DESCRIPTION OF THE PREFERRED EMBODIMENTS

Figure 1:
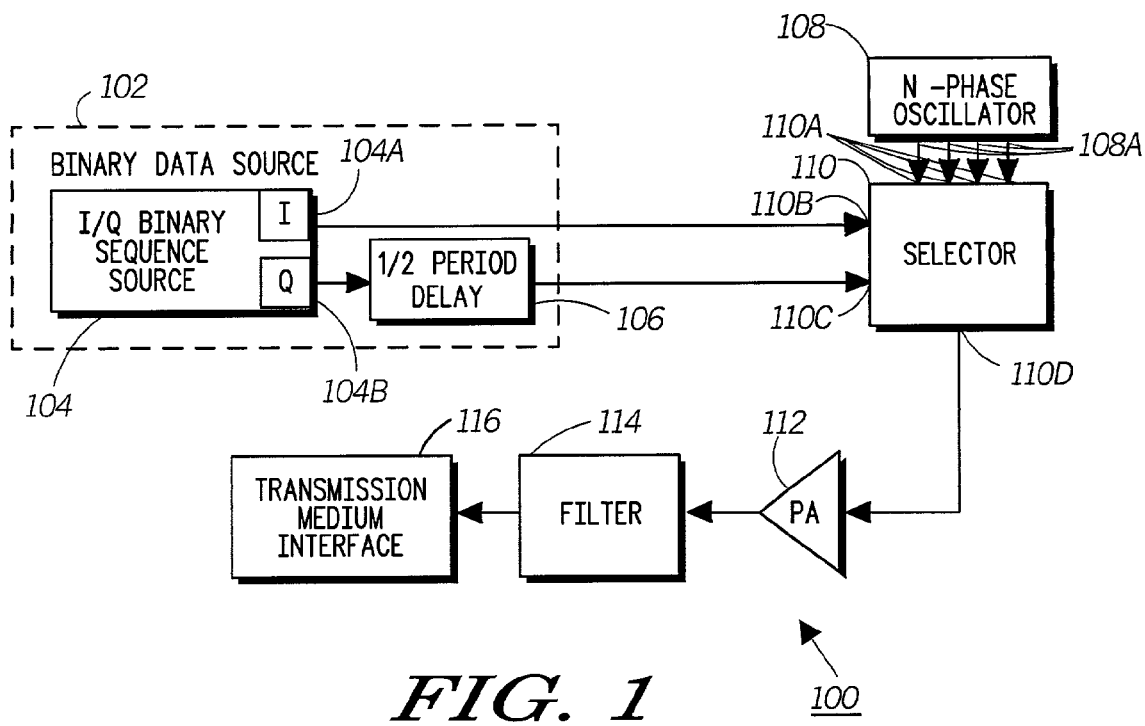
FIG. 1 is a functional block diagram of a phase shift key modulator according to a first alternative embodiment of the invention.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

Figure 6:
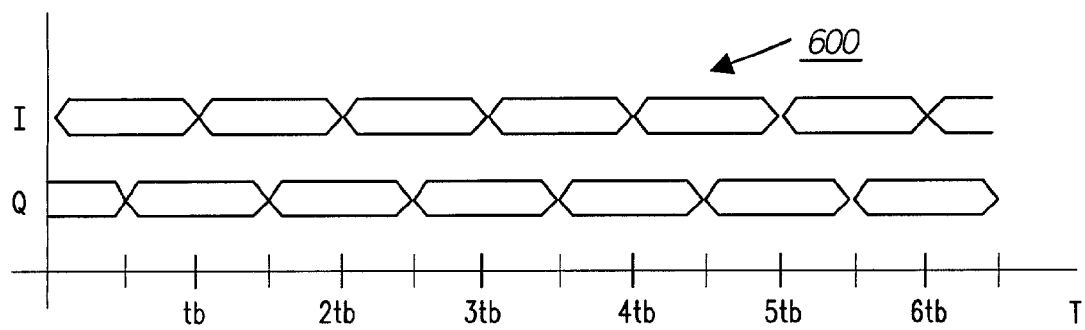
FIG. 6 is a timing diagram showing offset in-phase and quadrature phase signal periods as used in the modulators shown in FIGS. 1, 5 and 10.

FIG. 1 is a functional block diagram of a phase shift key modulator 100 according to a first alternative embodiment of the invention. Referring to FIG. 1, a binary data source 102 comprises an in-phase/quadrature (I/Q) binary sequence source 104, and a ½ signal period delay. The I/Q binary sequence source 104 comprises an in-phase channel output 104A, and a quadrature phase channel output 104B. A first binary data signal that is characterized by a data rate (inverse of a signal state period) is output by the in-phase channel output 104A, and a second binary data signal that is also characterized by the same data rate is output by the quadrature phase channel output 104B. The in-phase output 104A is coupled to a first phase select input 110B of a selector 110. (Note that the terms quadrature and in-phase are normally associated with two binary data channels because they are used to modulate phase of carrier that have quadrature phase relation. Although this is not done in the modulators described herein the designations quadrature and in-phase are retained.) The quadrature phase output 104B is coupled through the one-half signal state period delay 106 to a second phase select input 110C of the selector 110. The output of the binary sequence source 104, can for example be derived from a error correcting channel encoder. The output of the binary data source 102 is preferably presented in binary signal form as shown in FIG. 6 which is described more fully below. A pair of analog multiplexer that uses transmission gates and are operated in tandem can be used as the selector 110. The address lines of such multiplexers connected together serve as the first 110B and second 110C phase select inputs.

A multiphase oscillator 108 comprises a plurality of signal source outputs 108A that are coupled to a plurality of selector signal inputs 110A of the selector 110. Each of the signal source outputs 108A illustrated in FIG. 1 preferably comprise a pair of differential signal source outputs, and the selector 110 is preferably capable of selectively passing one of a plurality of differential signals. The multiphase oscillator 108 oscillates to generate a carrier signal and outputs a plurality of versions of the carrier signal that are characterized by a plurality of relative phases at the plurality of signal source outputs 108A. The plurality of versions of the carrier signal output by the multiphase oscillator 108 are preferably evenly spaced in phase. For example in order to encode two bits at a time (one from each of the channel outputs 104A, 104B of the binary sequence source 104) each possible permutation of the two bits (00, 01, 10, 11) is associated with one of four phases. The four phases used can for example be Pi/4, 3Pi/4, 5Pi/4, and 7Pi/4. The four phases are preferably connected to the selector signal inputs 110A in an order such that a change in one of the two bits applied to the select inputs 110B, 110C changes the phase of the selected signal by Pi/4. One order that satisfies the foregoing criteria, would associate bit pattern 00 with phase Pi/4, bit pattern 01 with phase 3Pi/4, bit pattern 11 with phase 5Pi/4, and bit pattern 10 with phase 7Pi/4. By ordering the inputs to satisfy the foregoing criteria, and using the one-half period delay 106, it is insured that jumps in phase of signals output by the selector 110 are limited to Pi/4. Limiting jumps to Pi/4 reduces out of band signal components.

The selector 110 comprises a selector output 110D for outputting a selected phase of the carrier signal. The selector output 110D is coupled to an input of a power amplifier 112. An output of the power amplifier 112 is coupled through a filter 114 to a transmission medium interface 116. The filter 114 preferably comprises a low pass filter. According to an alternative embodiment of the invention, the filter 114 comprises a band pass filter. The transmission medium interface 116 preferably comprises an antenna. The transmission medium interface 116 can to some degree, according to its frequency response, inherently serve as the filter 114. Other structures, e.g., strip lines, that are used in an integrated circuit or printed circuit board on which the modulator 100 is implemented and serve to couple the power amplifier 112 and the transmission medium interface 116 or shunt such a coupling to ground my also inherently exhibit frequency responses that allow them to serve as or augment the filter 114.

As mentioned above and described more fully below the multiphase oscillator 108 does not necessarily output a pure sinusoidal carrier signal. This being the case in the preferred embodiment, the filter 114 serves the useful function of removing undesired high frequency components from the carrier signal.

As shown in FIG. 1 and described above, the binary data source comprises an in-phase channel output 104A and a quadrature channel output 104B, and the modulator 100 outputs one of four phases depending on the pattern of binary data received from the outputs 104A, 104B. Alternatively the phase modulator is reconfigured so as to select one of only two phases (e.g., 0 and Pi) based on the binary values of binary data output by only a single binary data output. According to a further alternative embodiment, a number k, where k is greater than two, of binary data channels are used to couple k-bit words to the same number of select inputs of an alternative selector 110 for the purpose of selecting one of $2_K$ phases of carrier signal. For example a binary data stream, can be parsed into three separate channel signals, that are applied to select inputs of an alternative selector 110 in order to select one of 8 phases of carrier signal. In such an embodiment each of the 8 phase of the carrier signal is associated with one of all the possible patterns of three bits.

Figure 2:
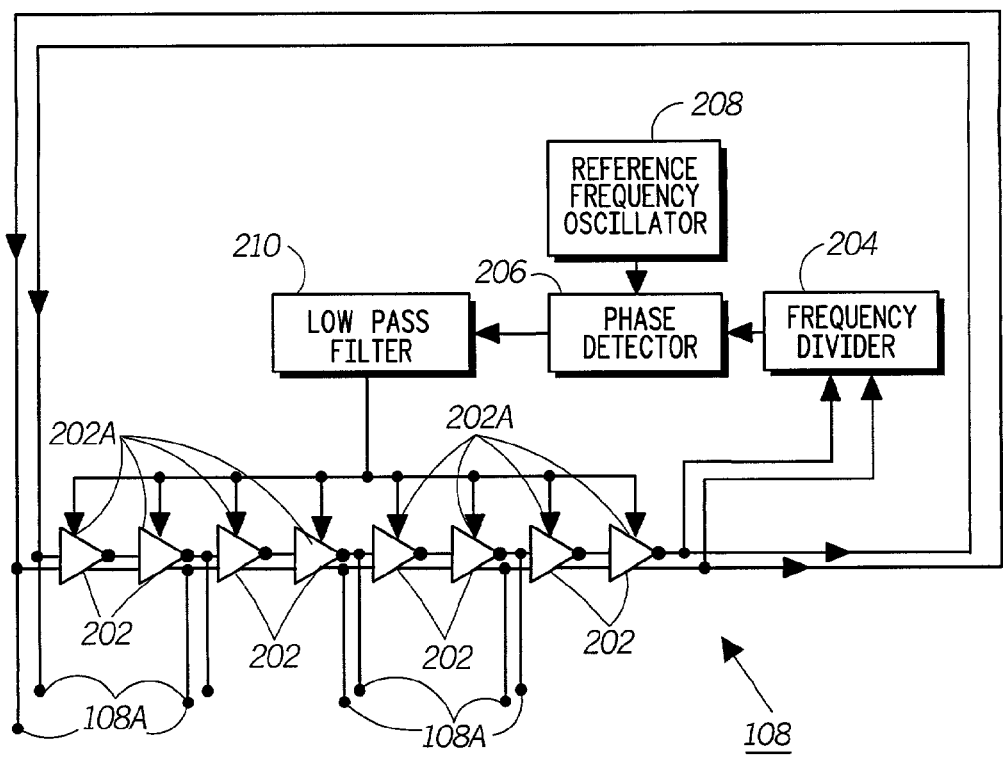
FIG. 2 is a functional block diagram of a multiphase oscillator used in the modulators shown in FIGS. 1 and 5 according to an embodiment of the invention.
Figure 5:
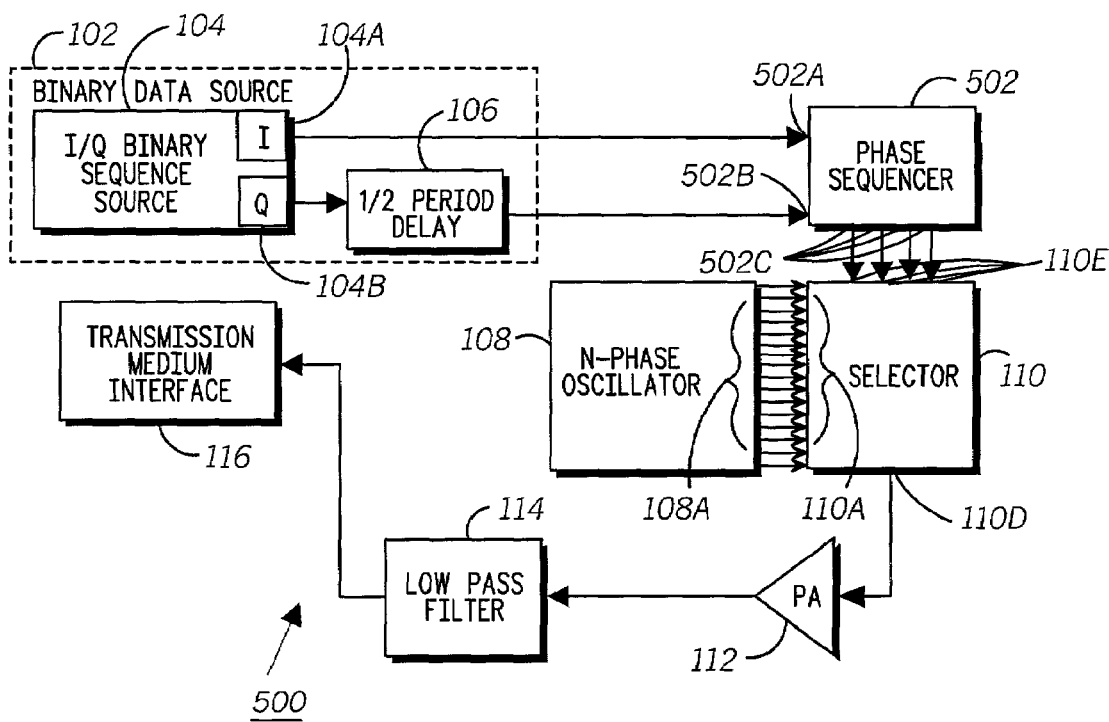
FIG. 5 is a functional block diagram of a phase shift key modulator according to a second alternative embodiment of the invention.

FIG. 2 is a functional block diagram of the multiphase oscillator 108 used in the modulators shown in FIGS. 1 and 5 according to an embodiment of the invention. As shown in FIG. 2 the multiphase oscillator 108 comprises a plurality of variable propagation delay differential inverters 202 coupled input-to-output in a ring configuration. Each of the plurality of controllable delay differential inverters 202 includes a propagation delay control input 202A. According to an alternative embodiment of the invention, only a subset of the inverters 202 have a controllable delay. The phase difference across each inverter 202 is $\pi+\delta\phi$ radians where $\delta\phi$ is preferably less $\pi$. The phase difference across each consecutive pair of inverters is $2\pi+2\delta\phi$ which is equivalent to $2\delta\phi$. Each pair of consecutive differential inverters 202 makes up a stage of the oscillator 108. Alternatively, rather than using the differential inverters, 202 other types of elements such as for example non inverting elements are used for each stage in lieu of a pair of differential inverters 202. As shown in FIG. 2, the signal outputs 108A are taken from the output of every other inverter 202 in the ring of inverters 202, so that the phase output at each successive signal outputs 108A increases by the discrete increment $2\delta\phi$. Alternatively, the signal outputs 108 are taken from the output of every inverter or less than every other inverter in the ring of inverters 202. Although four signal source outputs 108A are shown in FIG. 2 for purpose of illustration, and that number of signal source outputs can for example be used in connection with the modulator 100 shown in FIG. 1, for other embodiments described hereinbelow more signal source outputs 108A are preferably provided. More signal source outputs 108A are preferably provided by increasing the number of differential inverters 202 or by taping the output of each differential inverter 202 rather than every other differential inverter as is shown in FIG. 2.

A frequency divider 204 is coupled to the ring of inverters 202. The frequency divider 204 serves to divide the frequency of the carrier signal propagating around the ring of inverters 202 so that a meaningful comparison can be made between its phase and that of a lower frequency reference signal. The frequency divider 204 divides the carrier frequency by an integer value N and outputs a frequency divided signal. A frequency divided output of the frequency divider 204 is coupled to a phase detector 206. A reference frequency oscillator 208 that outputs the aforementioned lower frequency reference signal is also coupled to the phase detector 206. The phase detector 206 outputs a phase difference signal that depends on the magnitude of a difference between the phase of the lower frequency reference signal and the phase of the frequency divided signal. A low pass filter 210 includes an input that is coupled to phase detector for receiving the phase difference signal. The low pass filter 210 integrates the phase difference signal and outputs an integrated version of the phase difference signal at an output of the low pass filter 210. The propagation delay control inputs 202A of the controllable delay inverters 202 are coupled to the low pass filter 210 output for receiving the integrated version of the difference signal. The integrated version of the difference signal is used to control the propagation delay of the inverters 202. In operation the frequency divider 204, phase detector 206, reference frequency oscillator, and low pass filter 210 serve to lock the oscillation frequency of the ring of inverters 202 to the product of the frequency of the reference signal and the integer value N by which the carrier frequency is divided by the frequency divider 204.

Figure 13:
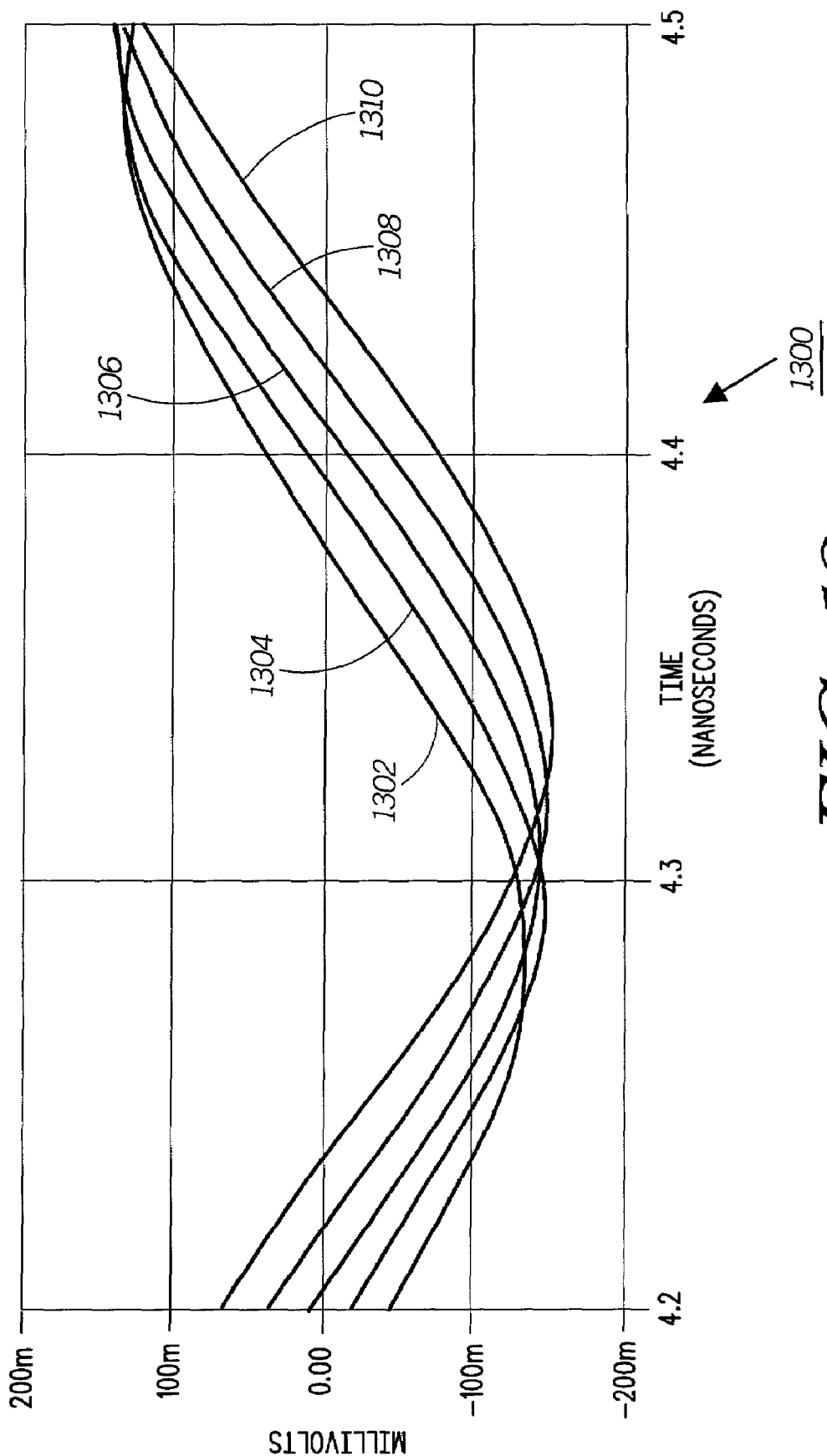
FIG. 13 is a graph showing two simulated carrier waveforms characterized by two different phases along with three simulated weighted sums of the two waveforms.

In the multiphase oscillator 108, the inverters 202 are periodically switched from one state to another thereby producing the carrier signal. The inverters 202 are ostensibly digital (two-state) devices. Ordinarily in digital circuits two signal levels corresponding to binary one and binary zero are of interest, and the transitions between the two states, i.e., the leading and trailing edges of high signal state periods, are preferably kept as short as possible. However, for use in generating a carrier signal, the differential inverters 202 are preferably operated at such a high frequency that a signal having substantial sloped portions and without distinct plateaus is obtained. FIG. 13 which is described more fully below, shows simulations of waveforms produced by an inverter chain oscillator. The sloped character of the waveforms is exploited by a phase interpolator 1106 used in a preferred embodiment modulator shown in FIG. 11. Another beneficial consequence of the sloped character of the waveform is that the proportion of signal power in the fundamental frequency component of the carrier signal is relatively high compared to what it would be for a digital waveform having substantially vertical transition edges. Thus, a reduced amount of carrier signal power will be removed from the signal by the filter 114.

The ring of inverters 202, frequency divider 204, phase detector 206, and low pass filter 210 is preferably fabricated using CMOS fabrication techniques.

Figures 3, 4:
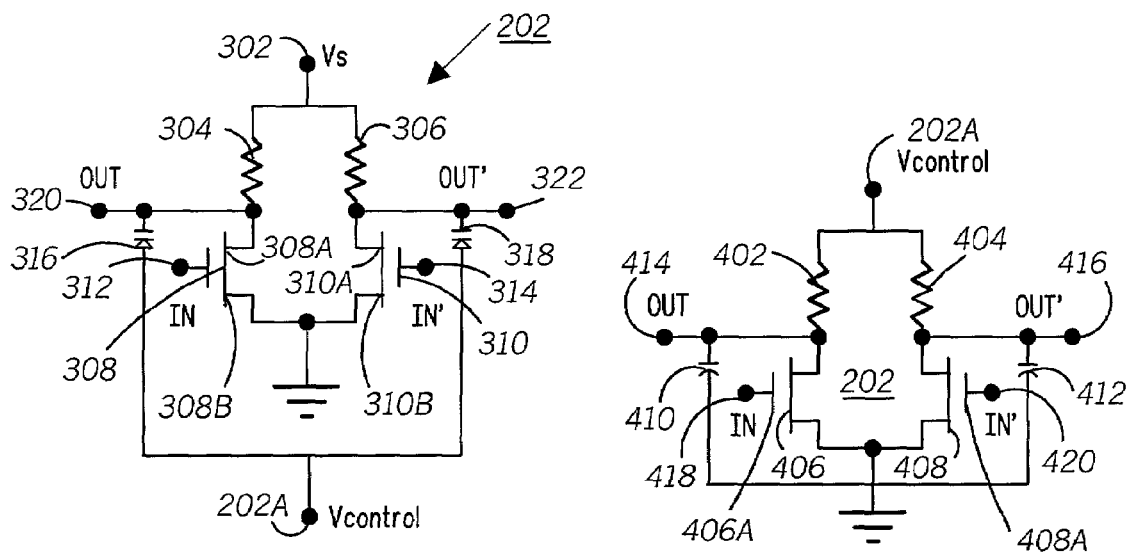
FIG. 3 is a circuit diagram of a variable propagation delay inverter used in the multiphase oscillator shown in FIG. 2 according to the preferred embodiment of the invention.
FIG. 4 is a circuit diagram of a variable propagation delay inverter for use in the multiphase oscillator shown in FIG. 2 according to an alternative embodiment of the invention.

FIG. 3 is a circuit diagram of one of the variable propagation delay inverters 202 used in the multiphase oscillator shown in FIG. 2 according to the preferred embodiment of the invention. According to the preferred embodiment of the invention, broadly speaking, the inverter 202 comprises a varactor loaded differential amplifier. Referring to FIG. 3, according to the preferred embodiment, the inverter 202 comprises a first resistor 304 and a second resistor 306 coupled to a supply voltage terminal 302. A first metal oxide semiconductor (MOS) transistor 308 includes a drain terminal 308A coupled to the first resistor 304, and similarly a second MOS transistor 310 includes a drain terminal 310A coupled to the second resistor 306. A source terminal 308B of the first MOS transistor 308, and a source terminal 310B of the second MOS transistor 310 are coupled to ground. A first varactor 316 is coupled between the drain terminal 308A of the first transistor 308 and ground, and similarly a second varactor 318 is coupled between the drain terminal 310A of the second MOS transistor 310 and ground. The cathodes of the first and second varactors 316, 318, are coupled to the drains of the respective MOS transistors 308, 310.

A first differential input 312 of the inverter 202 is coupled to a gate of the first MOS transistor 308. Similarly, a second differential input 314 of the inverter 202 is coupled to a gate of the second MOS transistor 310. A first differential output 320 of the inverter 202 is connected to the drain 308A of the first MOS transistor 308, and a second differential output 322 of the inverter 202 is connected to the drain 310A of the second MOS transistor 310. The inverters 202 are preferably coupled using differential inputs and outputs. The carrier signal generated by the multiphase oscillator 108 is preferably a differential signal.

The propagation delay control input 202A is coupled to anode terminals of the first 316 and second 318 varactors. By varying the voltage applied to the control input 202A the capacitance of the first 316 and second 318 varactors is varied. The propagation delay for a signal propagating through the inverter 202 is related to the time required for the voltage at the output terminals 320, 322 to swing from the a voltage required to turn on a MOS transistor in a next inverter to a voltage required to turn off a MOS transistor in the next inverter or vice versa. The latter time is dependent on the times required to charge and discharge the varactors 316, 318. Thus by varying a voltage applied to the propagation delay control input 202A, the propagation delay through each inverter 202 is varied. The propagation delays through the inverters 202 directly effects the oscillation frequency of the multi phase oscillator 108. Thus by applying the low pass filtered version of the phase difference signal that is output by the low pass filter 210 to the propagation delay control inputs 202A of the inverters 202 in the ring of inverters 202, the frequency of the carrier signal generated by the multiphase oscillator 108 is controlled. The RC time constant associated with the varactors 312, 314 and the resistors 304, 306 and the RC time constant associated with varactors 312, 314 and internal impedance's of the MOS transistors 308, 310 determine the shape of the carrier signal waveform and the duration's of the leading and trailing edges of the carrier waveform. The exact shape of the carrier waveform produced by the multi phase oscillator 108 is dependent on the frequency, operating voltages, circuit component parameters. The invention is not limited to a specific waveform of the carrier signal being generated by the multiphase oscillator 108. The filter 114 (FIG. 1) serves to filter out undesired frequency components from the carrier signal.

FIG. 4 is a circuit diagram of the variable propagation delay inverter 202 for use in the multiphase oscillator shown in FIG. 2 according to an alternative embodiment of the invention. According to this alternative embodiment each variable propagation delay inverter 202 takes the form of a capacitor loaded differential amplifier in which the integrated version of the phase difference signal output by the integrator is used as a biasing voltage. Referring to FIG. 4, a third resistor 402 and a third MOS transistor 406 are connected in series between the propagation delay control input 202A and ground. Similarly a fourth resistor 404 and a fourth MOS transistor 408 are connected in series between the propagation delay control input 202A and ground. The third 402 and fourth 404 resistors are connected to the propagation delay control input 202A. A first capacitor 410 is connected between the junction of the third resistor 402 and the third MOS transistor 406 and ground. Similarly second capacitor 416 is coupled between the junction of the fourth resistor 404 and the fourth MOS transistor 408 and ground. A third differential input 418 is connected to a gate 406A of the third MOS transistor 406. A fourth differential input 420 is connected to a gate 408A of the fourth MOS transistor 408. A third differential output 414 is connected to the junction of the third resistor 402 and the third MOS transistor 406. Similarly a fourth differential output 416 is connected to the junction of the fourth resistor 404 and the fourth MOS transistor 408. In operation, by controlling the magnitude of the integrated version of the phase difference signal applied to the propagation delay control input 202A the propagation delay of signals propagating through the variable delay inverter shown in FIG. 4 is controlled.

Although the design shown in FIG. 3 is the preferred design for the variable phase delay inverters 202, and FIG. 4 is one possible alternative design for the variable phase delay inverters 202, the invention should not be construed as limited to any particular inverter design. In particular, although differential inverters as shown in FIGS. 3 and 4 are preferred, alternatively non-differential inverters are used by properly biasing their outputs.

FIGS. 1-4 show two alternative embodiments of a phase modulator that, advantageously can be constructed largely using standard CMOS fabrication techniques. The described phase modulators provide for transmission of multiple phases of the carrier signal without the need for an analog mixer.

FIG. 5 is a functional block diagram of a second phase shift key modulator 500 according to a second alternative embodiment of the invention. Certain elements shown in FIG. 5 as identified by common reference numerals are also shown in FIGS. 1-4 and have been described above with reference to FIGS. 1-4. In the second modulator 500 the output of the binary data source 102 is coupled to a phase sequencer 502 rather than being coupled directly to the selector 110. The multiphase oscillator 108 used in the second modulator 500 is capable of outputting more phases of the carrier signal than there are permutations of the bits output by the binary data source 102 (e.g., in the preferred case that the binary data source outputs two binary values at a time, the multiphase oscillator 108 is capable of outputting more than four phases and preferably at least eight phase of the carrier signal). Additional phase of the carrier signal output by the multiphase oscillator 108 in the second modulator 500 are used as intermediate phase so as to avoid large jumps in the phase of signals produced by the second modulator 500.

The phase sequencer 502 comprises a first binary data input 502A that is coupled to the in-phase channel output 104A of the binary sequence source 104. The phase sequencer 502 further comprises a second binary data input 502B that is coupled to the quadrature phase channel output 104B of the binary sequence source 104 through the one-half period delay 106. For each pattern of binary data coupled from the first and second channel outputs 104A, 104B to the first 502A and second 504B binary data inputs of the phase sequencer 502, the phase sequencer 502 outputs a sequence of phase select signals at a plurality of phase select signal outputs 502C. The order in which the sequence of phase select signals are output by the phase sequencer is implicitly dependent on a bit pattern appearing at the first and second binary data inputs 502A, 502B prior to the bit pattern that triggered the sequence of phase select signals to be selected. Each phase select signal preferably takes the form of a multi-bit word that is output on the phase select signal outputs 502C. The phase select signal outputs 502C are coupled to a plurality of phase select inputs 110E of the selector 110. Signals coupled to the phase select inputs 110E of the selector 110 serve to control which of a plurality of phases of the carrier signal input at the selector signal inputs 110A are output at the selector signal output 110D.

According to an alternative embodiment, one of the channels of the binary sequence source 104 is eliminated so that the binary sequence source 104 outputs only a single data signal, and the phase sequencer 502 outputs signals to select at least two phases, for each signal state period of the single data signal. In such an alternative embodiment, the phases selected in response to a first state (e.g., binary one) are preferably equally distributed throughout a first Pi radian interval, and phases selected in response to a second state (e.g., binary zero) are preferably equally distributed over a second Pi radian interval that does not overlap the first Pi radian interval. Initial phases for each new signal state period are chosen in view of a last phase for a preceding signal state period so as to minimize phase jumps.

Figure 11:
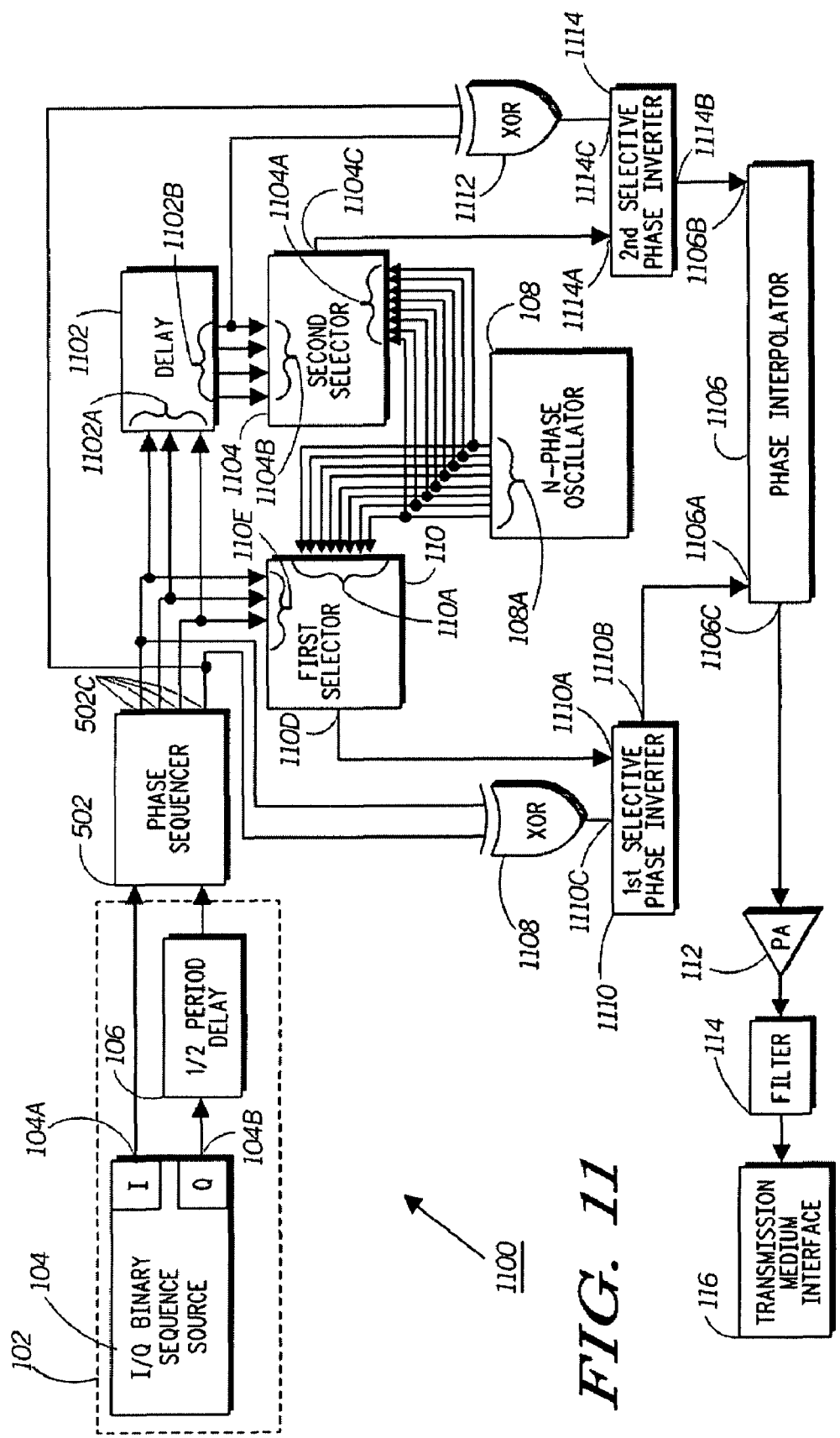
FIG. 11 is a functional block diagram of a phase shift key modulator according to the preferred embodiment of the invention.

FIG. 6 is a timing diagram 600 showing offset in-phase and quadrature phase signal periods as used in the modulators shown in FIGS. 1, 5 and 11. The abscissa of the timing diagram is a time axis, and is marked off in signal state periods, tb. The top part of the time diagram 600 shows a sequence of signal states of an in-phase channel binary data signal that is output by the in-phase channel output 104A. The lower part of the timing diagram 600 shows a sequence of signal states of a quadrature phase channel binary data signal that is output by the quadrature phase channel output 104B and delayed by the ½ signal state period delay 106. Each channel assumes signal states of binary zero or one for consecutive signal state periods of duration tb. Note that the signal periods of the quadrature phase channel are offset from signal state period of the in-phase channel by one-half of a signal state period tb. Therefore the binary value in only one channel reaching the binary data inputs 502A, 502B can change every one-half signal state period.

Figure 7:
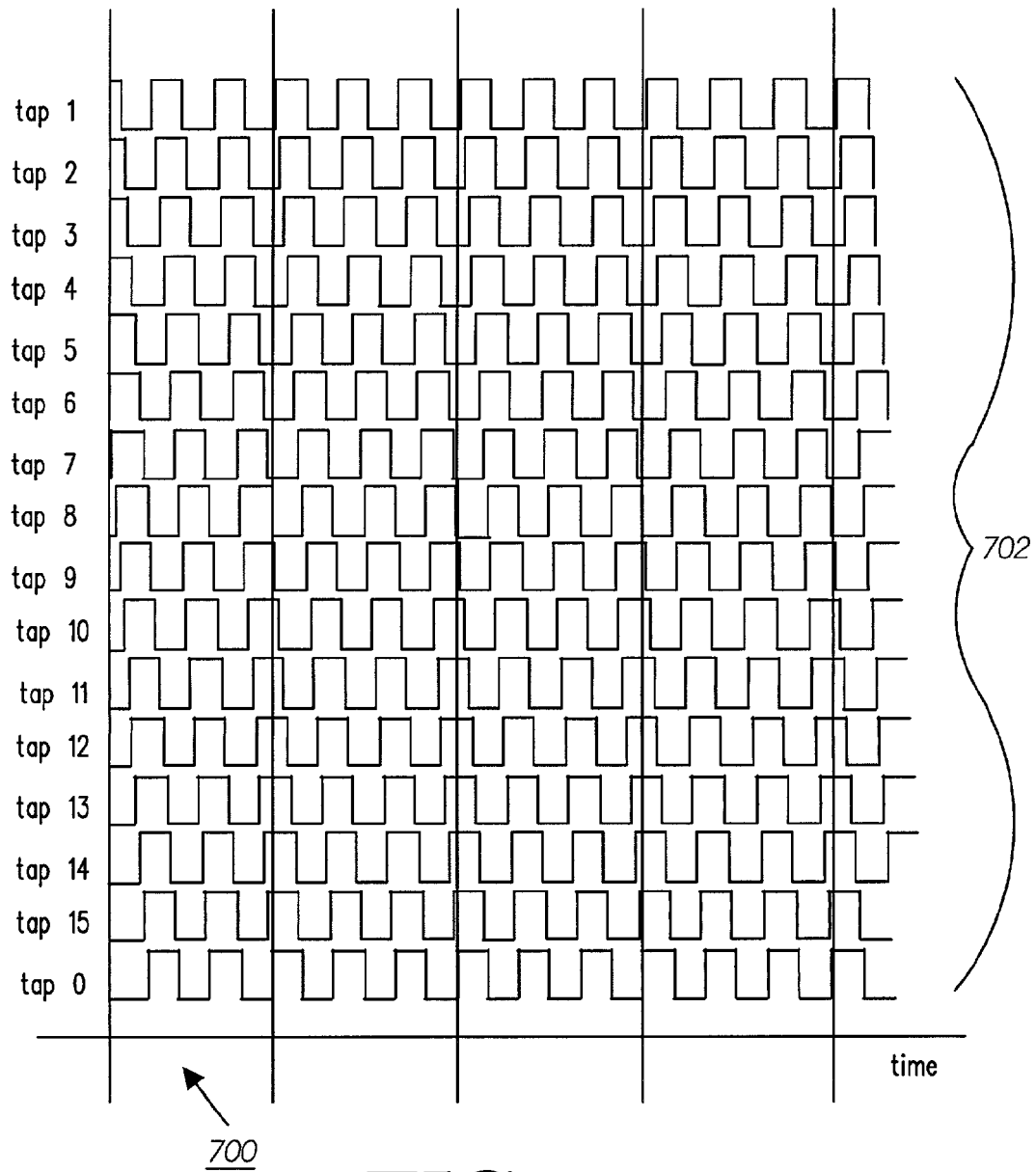
FIG. 7 is a time domain graph showing a plurality of discrete phase shift versions of a carrier signal which are produced by the multiphase oscillator shown in FIG. 5 according to the preferred embodiment of the invention.

FIG. 7 is a time domain graph 700 showing a plurality of discrete phase shift versions 702 of the carrier signal which are produced by the multiphase oscillator 108 shown in FIG. 5 according to the preferred embodiment of the invention. Note that in FIG. 7 the phase shifted versions 702 of the carrier signal are shown as square waves for the purpose of clearly illustrating the relative phases, whereas in fact, the carrier signal preferably includes substantial sloped portions. A total of sixteen phase of the carrier signal are shown. The sixteen phase of the carrier signal are labeled by tap numbers which identify a particular differential output pair 108A among the plurality of signal source outputs 108A of the multiphase oscillator 108. Note that although only four signal source outputs 108A are shown in FIG. 2, for use with the second modulator 500, the ring of inverters 202 can be extended so as to provide for 16 pairs of differential signal source outputs 108.

Figure 8:
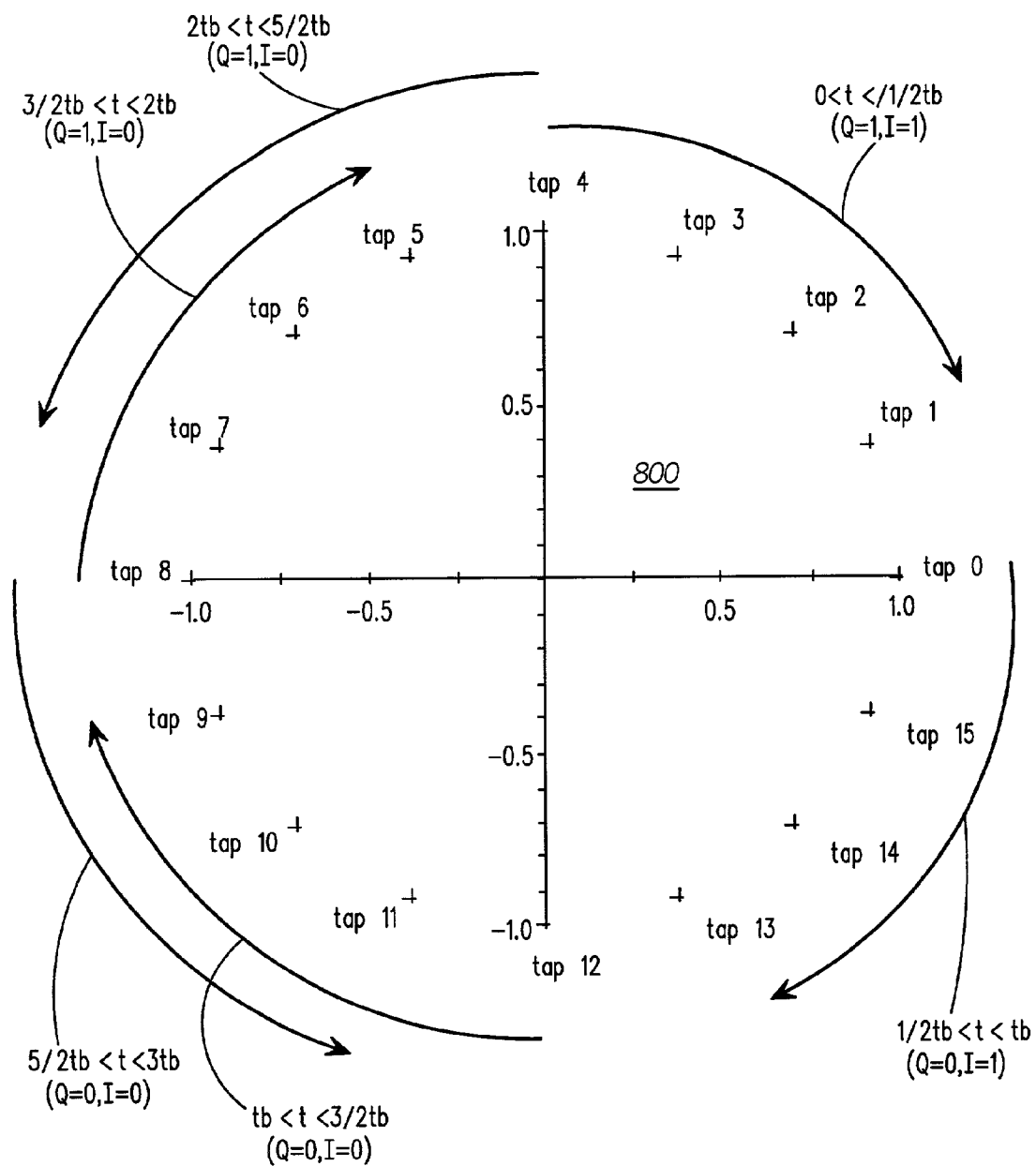
FIG. 8 is a phasor diagram showing a plurality of discrete phases of the carrier output by the multiphase oscillator shown in FIG. 5 according to the preferred embodiment of the invention.

FIG. 8 is a phasor diagram 800 showing the plurality of discrete phases of a carrier output by the multiphase oscillator shown in FIG. 5 according to the preferred embodiment of the invention. The tap numbers shown in FIG. 8 correspond to the tap numbers shown in FIG. 7. As is known to persons of ordinary skill in the communication art, the abscissa of the phasor diagram is the real axis, and the ordinate of the phasor diagram is the imaginary axis. Phase is equal to zero along the positive half of the real axis and increases in the counter clockwise direction, ranging through 2 Pi in one complete rotation around the diagram 800. Phase taps are preferably spaced by no more than Pi/4 radians, and more preferably by no more than Pi/8 radians.

The arrows encircling FIG. 8 specify a sequence of phases that are selected by the modulator 500, based on a hypothetical sequence of in-phase and quadrature phase channel signal states, according to an embodiment of the invention. The hypothetical sequence of the in-phase channel signal states corresponding to the encircling arrows is [1,1,0,0,0,0], and the hypothetical sequence of the in quadrature phase channel signal states corresponding to the encircling arrows is [1, 0,0,1,1,0]. Each element of the foregoing sequences indicates a signal state value for one-half of a signal state period. In actual use the sequences of signal states are dependent on what information is to be transmitted. Each arrow in FIG. 8 is labeled with a corresponding time range i.e. a time during which the phases indicated by the arrow are sequentially selected, and is also labeled with the combination of in-phase and quadrature phase signal states that dictated the sequence of phases indicated by the arrow. Note that within the time period corresponding to each arrow, phase is incremented in discrete steps of one tap position so that large phase jumps are avoided. Note also that phase changes by only one tap position at the transitions between successive ½ signal state periods.

Figure 9:
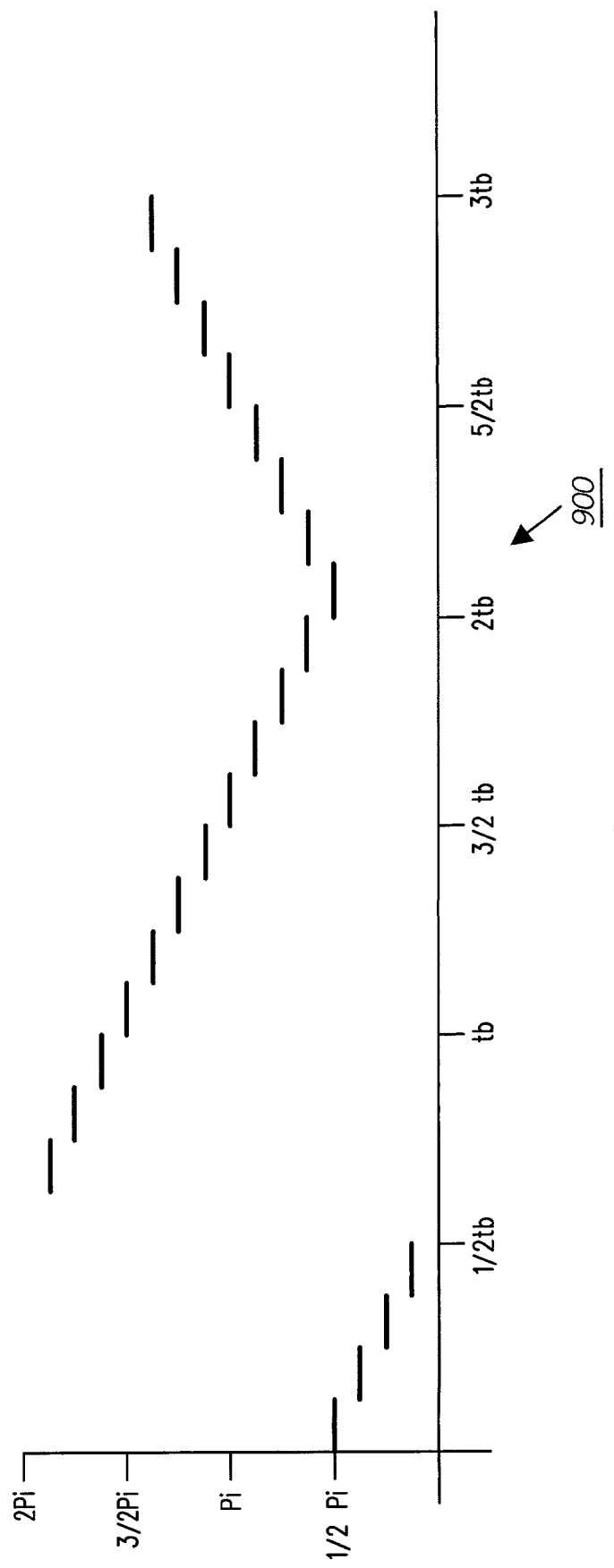
FIG. 9 is a plot of carrier phase versus time that is output by the modulator shown in FIG. 5 for a hypothetical sequence of I and Q channel signal states.

FIG. 9 is a plot of carrier phase versus time output by the modulator shown in FIG. 5 for the above mentioned hypothetical sequences of in-phase and quadrature channel signal states. In FIG. 9 the phase values on the ordinate correspond to taps shown in the phasor diagram 800 (FIG. 8). In FIG. 9, time is marked off along the abscissa in units of the signal state period tb. The sequence of phases illustrated in FIG. 9 correspond to those indicated by the arrows encircling FIG. 8. Note that although it appears that there is a large phase jump at ⅝tb, in fact phase changes by ⅛ Pi from zero to ¹⁵⁄₈Pi. The period for which each phase is selected is termed the phase period. As is evident in FIG. 9 there are eight phase periods per signal state period. There are preferably at least four phase periods per signal state period, and more preferably at least eight phase periods per signal state period. The foregoing preferences as to the number of phases output per signal state period also applies to the modulators shown in FIGS. 11, and 17, and the method described with reference to FIG. 16.

During each one-half signal state period a monotonic sequence of N/4 phases, where N is the number of taps covering 2Pi radians (e.g., 16 for the second modulator, 500 as shown in FIG. 8), of the carrier will be coupled to the phase selector output 110D (FIG. 5). Accordingly, the total phase change of the sequence of taps selected during each one-half signal state period is preferably:

$$\left(\frac{N}{4} - 1\right)\frac{\text{Pi}}{4}$$

The starting phase of a monotonic sequence of phases selected for a ½ signal state period after a signal state transition preferably starts within one tap position of a last phase selected for a ½ signal state period preceding the signal state transition. More preferably, a first tap selected for a ½ signal state period after a signal state transition is displaced by one tap position from a last tap selected during a ½ signal state period preceding the signal state transition. Outputting a monotonic sequence of closely spaced phases during each ½ signal state period, and abiding the foregoing preference relating last and first taps selected for successive ½ signal state periods serves to avoid large phase jumps and reduce undesired out of band signal components.

Note, that due to propagation delays in electronic circuits there will be a lag between occurrence of signal state transitions in the signals output by the binary sequence source 104 and selection of monotonic sequences of phases, in response to signal states obtaining after the signal state transitions.

If the aforementioned preference relating the last and first tap (phase) selections for successive ½ signal state periods is abided, a remaining question is the phase direction (i.e., clockwise or counterclockwise) of the monotonic sequences of phases selected for successive ½ signal state periods. According to present invention the phase direction of monotonic sequences taps selected for each possible for combination of signal states of the in-phase and quadrature phase channels (e.g., for Q=1, I=0) can be either clockwise or counterclockwise. In the case that signal states preceding and succeeding a signal state transition are identical the phase directions of the monotonic sequences of phases selected for the signal states preceding and succeeding the transition will be opposite. On the other hand if the signal states preceding and succeeding a signal state transition are different then the phase direction of the monotonic sequences of phases selected for the signal states preceding and succeeding the signal state period will be the same.

By selecting monotonic sequences of phases, that are characterized by the preferred phase direction, starting phase, total phase change, and tap spacing, spectrum efficient signaling can be performed.

Figure 10:
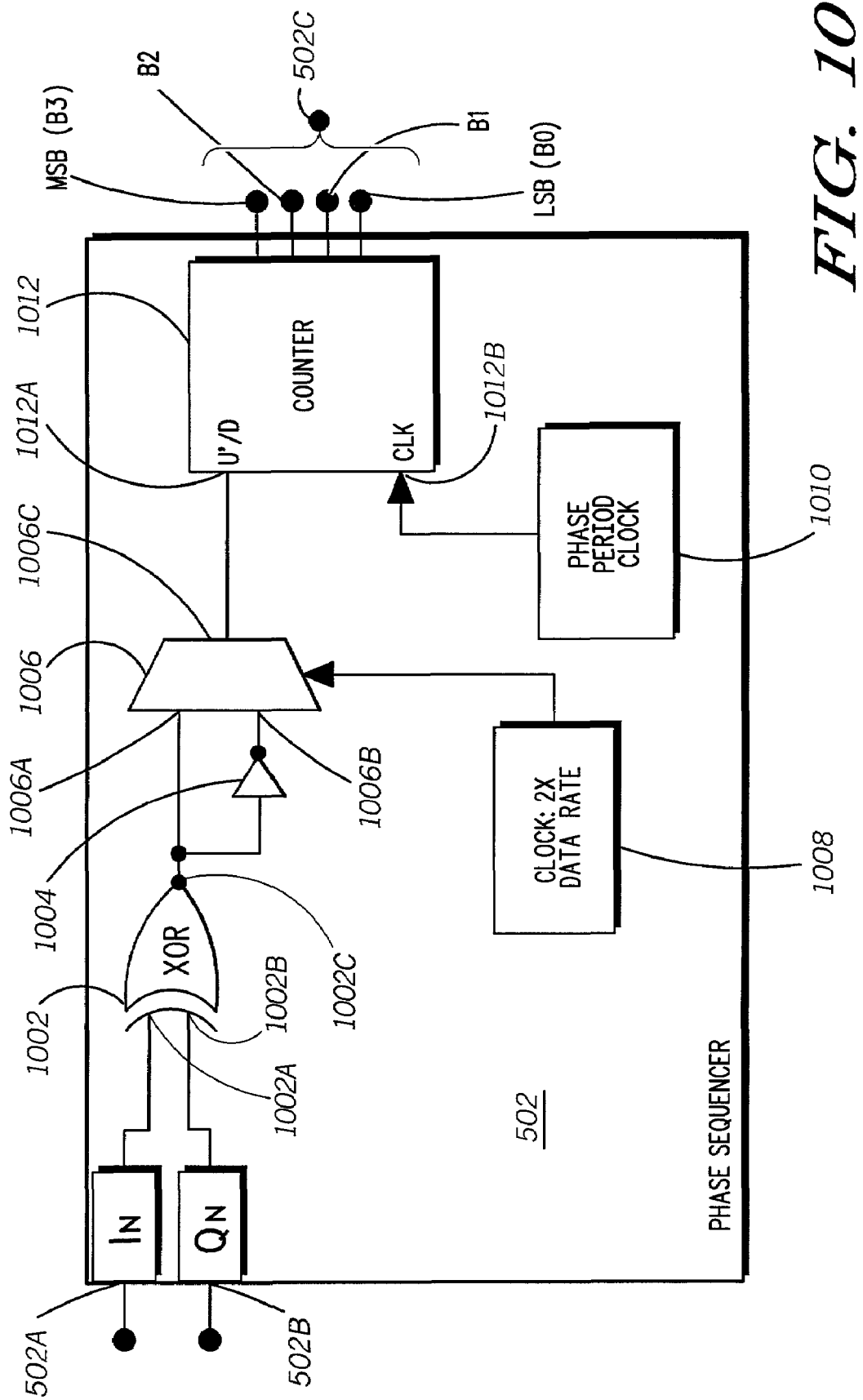
FIG. 10 is a functional block diagram of a phase sequencer that is used in the modulators shown in FIGS. 5 and 11 according to the preferred embodiment of the invention.

FIG. 10 is a functional block diagram of the phase sequencer 502 that is used in the modulators shown in FIGS. 5, 11 according to the preferred embodiment of the invention. Referring to FIG. 10, the first 502A and second 502B binary data inputs are applied to inputs 1002A, 1002B respectively of an XOR gate 1002. An output 1002C of the XOR gate is applied directly to a first input 1006A of a two-to-one multiplexer 1006, and is applied through an inverter 1004 to a second input 1006B of the two to one multiplexer 1006. A 2X data rate clock 1008 is applied to a select input to the multiplexer 1006. The period of the 2X data rate clock 1008 is one-half the signal state period. The application of the 2x data rate clock 1008 to the multiplexer 1006 causes the multiplexer 1006 to alternately couple its first and second inputs 1006A, 1006B to a multiplexer output 1006C. The multiplexer 1006 couples one of the inputs 1006A, 1006B to the output 1006C for one-half the signal state period and then couples the other of the inputs 1006A, 1006B to the output and so on. The output 1006C is applied to a direction control input 1012A of a counter 1012. A phase period clock 1010 is applied to a clock input 1012B of the counter 1012. Outputs of the counter 1012 serve as the phase select signal outputs 502C of the phase sequencer 502. The phase select signal outputs include a most significant bit (MSB) and a least significant bit (LSB).

Note that by virtue of the inverter 1004, the signals applied to the inputs 1006A, 1006B of the multiplexer will always be opposite i.e., one high and one low. In operation, as long as the signals applied to the first and second binary data inputs 502A, 502B remain unchanged, the phase sequencer 502 will change the direction of the counter 1012 every one-half signal state period. Under the foregoing circumstance the phase direction (clockwise or counterclockwise) that characterizes monotonic sequences of phases selected for successive one-half signal state periods will also alternate.

When one of the signals applied to the binary data inputs 502A, 502B changes, the signal states appearing at the inputs 1006A, 1006B of the multiplexer will be exchanged. Consequently the signals appearing at the output 1006C of the multiplexer will be unchanged (i.e. it will be the same after the signal state transition as before), and the counter 1012 will continue to count in the same direction after the signal state transition as before. Consequently, the phase direction (clockwise or counterclockwise) that characterizes the monotonic sequences of phases selected for the one-half signal state periods preceding and succeeding the signal state transition will be the same.

Although FIG. 10 shows one particular design for the phase sequencer 502 other designs that accomplish the same or similar function can be used, and the invention should not be construed as limited to the exemplary design illustrated in FIG. 10. For example, a programmed microprocessor is alternatively used to implement the phase sequencer 502.

The phase sequencer as shown in FIG. 10 is preferably implemented as a CMOS circuit.

FIG. 11 is a functional block diagram of a phase shift key modulator 1100 according to the preferred embodiment of the invention. The modulator 1100 shares a number of parts that are identified by common reference numerals with the modulators shown in FIGS. 1 and 5. Those common parts are described above. In the preferred modulator 1100, the phase sequencer 502 is coupled to the selector 110 (referred to hereinafter, in the context of FIG. 11, as the first selector 110) as in the second modulator 500, but unlike in the second modulator 500, in the preferred modulator 1100, the phase sequencer 502 is also coupled through a one phase period delay 1102 to a plurality of phase select inputs 1104B of a second selector 1104. One phase period is equal to the length of time for which each phase is selected by the phase sequencer 502. The delay 1102 includes a plurality of delay inputs 1102A that are coupled to all but the most significant bit of the phase select signal outputs 502C of the phase selector 502, and a plurality of delay outputs 1102B that are coupled to the phase select inputs 1104B of the second selector 1104. The second phase selector 1104 comprises a plurality of signal inputs 1104A that are coupled to the signal source outputs 108A of the multiphase oscillator 108. The second selector 1104 further comprises a second selector output 1104C. In operation, the phases output by the second selector 1104 lag phases output by the first selector 110 by one phase period. In the preferred phase shift key modulator 1100 the most significant bit is also not applied directly to the first selector 110, rather it is used for another purpose described below. The bit width of the phase select outputs 502C is alternatively varied, and the number of signal source outputs 108A of the multiphase oscillator 108 is alternatively varied.

The output 110D of the first selector 110 is coupled to a signal input 1110A of a first selective phase inverter 1110. The output 1104C of the second selector 1104 is coupled to a signal input 1114A of a second selective phase inverter 1114. The outputs, of the first and second selectors 110, 1104 and the inputs of the first and second selective phase inverters 1114 preferably each include a pair of differential signal outputs. Note that in connection with the preferred embodiment 1100 the total delay length of the multiphase signal source 108 is preferably about Pi radians, and preferably the output of each inverter rather than every other inverter 202 (FIG. 2) is tapped. The first and second selective phase inverters 1110, 1114 serve to selectively shift the phase of carrier signals received at their inputs 1114A, 1110A by Pi radians. Selectively phase inverted carrier signals are output at an output 1110B of the first selective phase inverter 1110, and also at an output 1114B of the second selective phase inverter 1114. The outputs 1110B, 1114B of each of the selective phase inverters 1110, 1114 preferably include a pair of differential signal outputs. Phase inversion is preferably accomplished within each selective phase inverter 1110, 1114, by selectively transposing connections between the differential signal inputs 1110A, 1114A and differential signal outputs 1110B, 1114B. Selective inversion is preferably accomplished using a pair of two to one analog multiplexers within each selective phase inverter 1110, 1114. Alternative means for accomplishing a phase inversion or phase shift by 180 degrees can be used.

Selective inversion that is performed by the first selective phase inverter 1110 is preferably dictated by the output of a first XOR gate 1108 that is coupled to a control signal input 1110C of the first selective phase inverter 1110. Inputs of the first XOR 1108 are tapped from the least significant bit, and the most significant bit among the outputs 502C of the phase sequencer 502. Note that a least significant bit value of 1 preferably specifies an odd numbered output of the multiphase signal source 108 which is associated with a phase of Pi+Nδφ, where N is an odd integer. If the latter phases are to be placed in the 0 to Pi range of the phasor diagram 800 they are inverted. On the other hand even taps of the multiphase signal source 108 have phases Mδφ, where M is an even integer. If the latter phases are to be placed in the Pi to 2Pi range of the phasor diagram 800 they are inverted. The most significant bit of the outputs 502C of the phase sequencer 502 preferably specifies whether a phase in the 0 to Pi range or a phase in the Pi to 2Pi range is to be output. Hence the XOR gate 1110 is suitably used to control the selective phase inverter 1108.

Similarly selective phase inversion that is performed by the second selective phase inverter 114 is preferably dictated by the output of a second XOR gate 1112 that is coupled to a control signal input 1114C of the second phase selector 1114. Input of the second XOR gate 1112 are tapped from a least significant bit among the outputs 1102B of the delay 1102, and the most significant bit among the outputs of the phase sequencer 502C.

The output 1110B of the first selective phase inverter 1110 is coupled to a first input 1106 of a phase interpolator 1106 and the output 1114B of the second selective phase inverter 1114 is coupled to a second input 1106B of the phase interpolator 1106. The phase interpolator 1106 preferably serves to selectively combine each phase of the carrier signal output by the first selective phase inverter 1110 with a phase of the carrier signal that is concurrently output by the second selective phase inverter 1114, and output at a phase interpolator output 1106C either the phase of the carrier output by the first selective phase inverter 1110, the phase of the carrier output by the second selective phase inverter 1114 or one of one or more interpolated phases that fall between the phases output by the first 1110 and second 1114 selective phase inverters. The phase interpolator 1106 preferably operates by taking a weighted sum of each phase output by the first selective phase inverter 1110, and a phase concurrently output by the second selective phase inverter 1114. The weights used in performing the weighted sum are alternatively changed continuously or in series of steps in such a manner that a phase output by the phase interpolator 1106 gradually or incrementally changes from a phase equal to or close to that output by the second selector 1104, to a phase equal to or close to that output by the first selector 110 during the course of each phase period. If in the preferred case that the phase output by the phase interpolator 1106 changes incrementally, each phase output by the phase interpolator 1106 is preferably output for a fixed fraction of the phase period, termed a sub-phase period. Thus, the phase interpolator 1106 allows more phases of the carrier to be produced without requiring the phase delay δφ across each sequential pair of inverters 202 of the multiphase oscillator 108 to be reduced. This is particularly advantageous because the degree to which the phase delay δφ can be reduced can be restricted by device design constraints for a particular semiconductor fabrication process. The phase interpolator 1106 serves to output phases of the carrier signal in addition to those output by the mutiphase oscillator 108.

The output 1108B of the phase interpolator 1106 is coupled through the power amplifier 112, and filter 114 to the transmission medium interface 116.

According to another alternative embodiment of the invention, the first and second selective phase inverters 1110, 1114 are eliminated. In such an alternative embodiment a lesser number of phases would be available to the phase interpolator 1106, unless other modifications are made to compensate for the loss of phases, e.g., increasing the number of stages in the multiphase oscillator 108.

According to yet another alternative embodiment of the invention the first selective phase inverter 1110 is interposed between the selector 110 and the amplifier 112 used in the second embodiment shown in FIG. 5.

Figure 12:
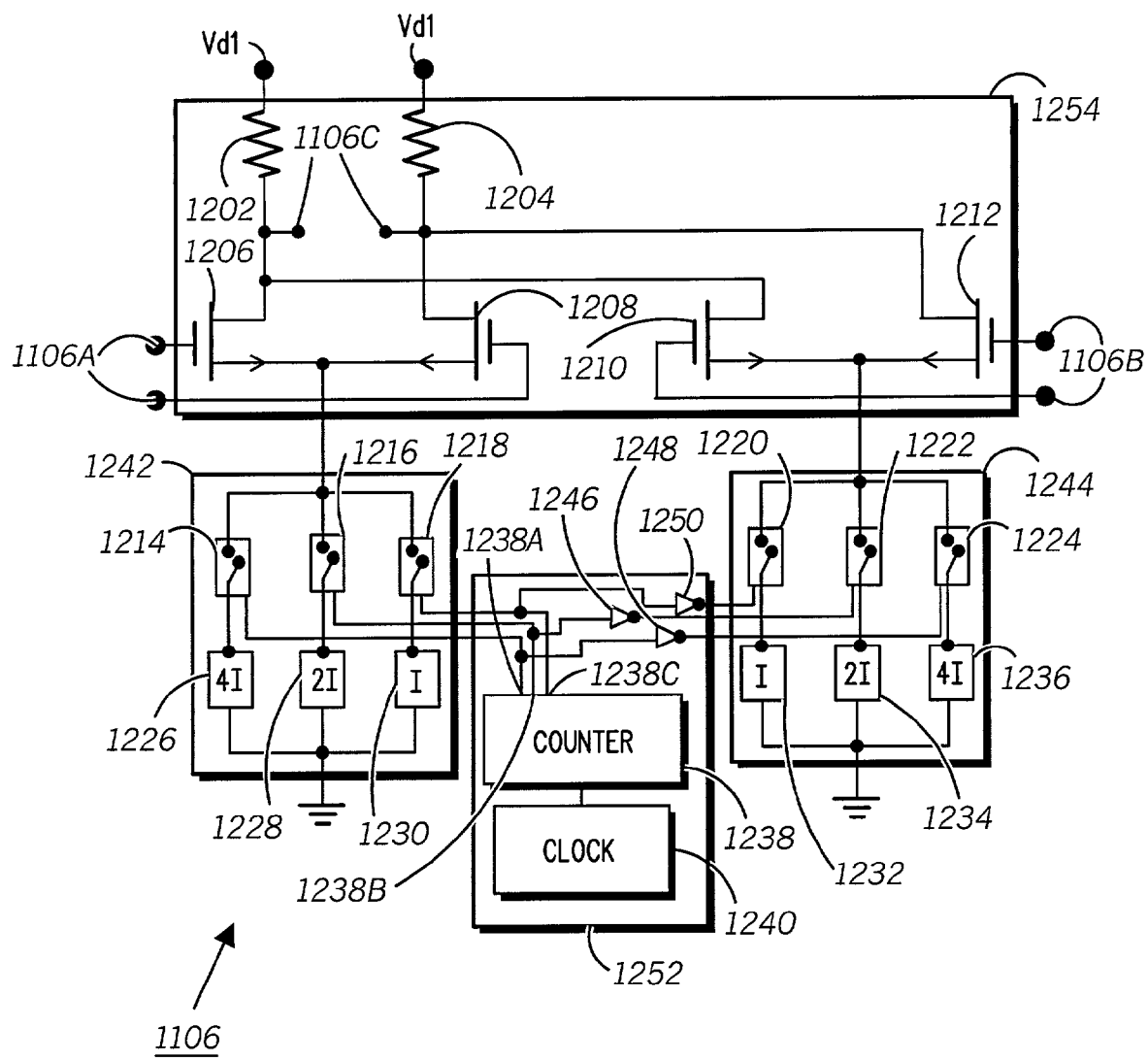
FIG. 12 is a circuit block diagram of the phase interpolator that is used in the modulator shown in FIG. 11 according to the preferred embodiment of the invention.

FIG. 12 is a circuit block diagram of the phase interpolator 1006 according to the preferred embodiment of the invention. Referring to FIG. 12 a first resistor 1202 is interposed between a biasing voltage Vd1 and a drain of a fifth MOS transistor 1206, and a second resistor 1204 is interposed between the biasing voltage Vd1 and a drain of a sixth MOS transistor 1208. A gate of the fifth MOS transistor 1206 in combination with a gate of the sixth MOS transistor 1208 serve as the first input 1006A of the phase interpolator 1006. As shown in FIG. 12, the phase interpolator 1006 operates on differential signals. A source of the fifth MOS transistor 1206, and a source of the sixth MOS transistor 1208 are coupled to a first selectable current current source 1242. The first selectable current current source 1242 comprises a first fixed current source 1226, a second fixed current source 1228, and a third fixed current source 1230 that are selectively connected to the drains of both the fifth 1206 and sixth 1208 transistors, through a first switch 1214, a second switch 1216, and a third switch 1218 respectively. The first, second, and third switches 1214, 1216, 1218 preferably comprise transistor based switches. The first fixed current source 1226 draws twice the current that the second fixed current source 1228 draws, and the second fixed current source 1228 draws twice the current that the third fixed current source draws. By selectively closing the first, second and third fixed switches 1214, 1216, 1218 the current drawn by the first selectable current source 1242 can be set to a multiple of up to seven of the current drawn by the third fixed current source 1218. The first second and third fixed current sources 1214, 12 1218 are coupled to ground.

A drain of a seventh MOS transistor 1210 is coupled to the drain of the first transistor 1206 and to the first resistor 1202. A drain of an eighth MOS transistor 1212 is coupled to the drain of the sixth MOS transistor 1208 and to the second resistor 1204. A gate of the seventh MOS transistor 1210 and a gate of the eighth MOS transistor 1212 serve as the second input 1006B of the phase interpolator 1006. A source of the seventh MOS transistor 1210, and a source of the eighth MOS transistor 1212 are both coupled through a fourth switch 1220, fifth switch 1222, and sixth switch 1224 to a fourth fixed current source 1232, a fifth fixed current source 1234 and a sixth fixed current source 1236 respectively of a second selectable current current source 1244. The fourth fixed current source 1232 draws the same amount of current as the third fixed current source 1230. The fifth fixed current source 1234 draws twice as much current as the fourth current source 1232 and the same amount of current as the second fixed current source 1228. The sixth fixed current source 1236 draws twice as much current as the fifth fixed current source 1234 and the same amount of current as the first fixed current source 1226. The fourth 1232, fifth 1234, and sixth 1236 current fixed current sources are coupled to ground.

A first terminal connected to the drains of the fifth 1206 and seventh 1210 MOS transistors, and a second terminal connected to the drains of the sixth 1208 and eighth 1212 MOS transistors serve as the phase interpolator output 1006C that as shown in FIG. 12 is a differential output.

The fifth through eighth transistors 1206-1210 in combination with the first and second resistors 1202, 1204 form a summer 1254 for summing two differential type signals that are characterized by different phases. Phase interpolation is preferably accomplished by taking a weighted sum of two differential signals characterized by different phases.

A phase interpolator clock 1240 is coupled to a counter 1238 for driving the counter 1238. A clock signal output by the phase interpolator clock 1240 is characterized by a frequency that is a multiple of the inverse of the above mentioned phase period. In other words, the period of the phase interpolator clock 1240 is equal to the above mentioned sub-phase period. The phase interpolator clock 1238 includes a plurality of count outputs 1238A, 1238B, and 1238C on which a binary count from binary 000 to binary 111 (equal to decimal 7) is output. The first count output 1238A is coupled to a control input of the first switch 1214, and is coupled through a first inverter 1246 to a control input of the sixth switch 1224. The second count output 1238B is coupled to a control input of the second switch 1216, and through a second inverter 1248 to a control input of the fifth switch 1222. A third count output 1238C is coupled to the third switch 1218, and through a third inverter 1250 to a control input of the fourth switch 1220. The clock 1240, counter 1238, and inverters 1246, 1248, 1250 serve as a controller 1252 for controlling the selection of currents drawn or supplied by the selectable current current sources 1242, 1244.

The count coupled from the count outputs 1238A, 1238B, 1238C to the first, second and third switches 1214, 1216, 1218 when added to the count reaching the fourth, fifth, and sixth switches 1220, 1222, 1224 through the first, second, and third inverters 1246, 1248, 1250 is equal to maximum output of the counter 1238 (e.g., decimal 7). The count reaching the three switches 1214, 1214, and 1216 of the first selectable current current source 1242 repeatedly counts up from 000 to 111, whereas the count reaching the three switches 1220, 1222, 1224 of the second selectable current current source 1244 concurrently, repeatedly counts down from 111 to 000. Because the fixed current values of the fixed current sources 1226, 1228, 1230, 1232, 1234, 1236 correspond to the order of magnitude of the count outputs 1238, 1238B, 1238C that control them, as the counter 1238 counts the selectable current source 1242, 1244 will successively draw currents that are a multiple (up to seven times) of the current drawn by the third 1230 and fourth 1232 fixed current sources. The current drawn by the first selectable current current source 1242 will repeatedly increase by increments of the current drawn by the third 1230 and fourth 1232 fixed current sources up to seven times that current and then start again at zero. At the same time the current drawn by the second selectable current current source 1244 will repeatedly decrease from seven times the current drawn by the third 1230 and fourth 1232 fixed current source down to zero and then restart again.

When viewed over time the current drawn by the first selectable current current source 1242 follows a quantized up-slope saw tooth waveform, whereas the current drawn by the second selectable current current source 1244 follows a quantized down-slope saw tooth waveform.

The differential signal output at output 1006 includes a first term that is due to the difference between the current flowing through the fifth 1206 and sixth 1208 MOS transistors, and a second term that is due to the difference between the current flowing through the seventh 1210 and eighth MOS transistors. The magnitude of the first term is scaled by the current drawn by the first selectable current current source 1242, and the magnitude of the second term is scaled by the current drawn by the second selectable current current source 1244. Thus the phase interpolator 1006 as shown in FIG. 12 functions as a summer and performs a weighted sum of a first phase of the carrier input at the first input 1006A with a second phase of the carrier input at the second inputs 1006B. The sum of the weights used in performing the weighted sum is fixed (e.g. at binary 111). The weight applied to the phase of the carrier signal input at the first input 1006A follows a quantized up-slope saw tooth waveform, whereas the weight applied to the phase of the carrier signal input at the second input 1006B follows a quantized down-slope saw tooth waveform.

As the weights are varied during each phase period, the phase of a version of the carrier signal output at phase interpolator output 1006C increases in a number steps (e.g., seven in the case of a count up to binary 111) from the phase input at the second phase interpolator input 1006B to the phase input at the first phase interpolator input 1006A.

Although it is preferred, as described above, that the weights applied to two phases of the carrier input at the phase interpolator inputs 1006A, 1006B follow a linear progression (e.g., seven equal steps) during each phase period, alternatively the weights follow a non-linear progression.

Although a specific preferred circuit for implementing the phase interpolator 1006 is shown in FIG. 12 and described above, other implementations of the phase interpolator that perform the functions described above can alternatively be used.

By providing the first selector 110 and the second selector 1004 and using the phase interpolator interpolate between each pair of phase simultaneously selected by the first 110 and second 1004 selectors, the generation of successive versions of the carrier signals that are closely spaced in phase is facilitated. Using a succession of closely spaced phases of the carrier signal further reduces undesired out of band signal components.

FIG. 13 is a graph 1300 showing two simulated carrier wave forms characterized by two different phases along with three simulated weighted sums of the two wave forms. Time is marked off on the abscissa in nanoseconds, and signal level in millivolts is given by the ordinate. The frequency of the signals in the graph is 2.5 GHz (corresponding to a period of 0.4 nanoseconds). A substantial portion of the 0.4 nanosecond period is shown in the graph. The leftmost 1302 and rightmost 1310 curves represent two phases of a carrier signal that differ in phase by about 1.1 radians. The left most curve 1302 and the rightmost curve 1310 represent two phases of the carrier output by the multiphase oscillator 108. The three curves between them 1304, 1306, 1308 represent different weighted sums of the leftmost and rightmost phases. The center curve 1306 represents a sum with equal weights of the leftmost and rightmost phases. The second curve from the left 1304 represents a weighted sum including ¾ times the leftmost curve plus ¼ times the rightmost curve. The curves shown in FIG. 13 demonstrate how the phase interpolator 1106 can be used to obtain intermediate phases of the carrier signal. It is also apparent in FIG. 13 that unlike a true digital square wave, the carrier signal includes substantial sloped portions.

Figure 14:
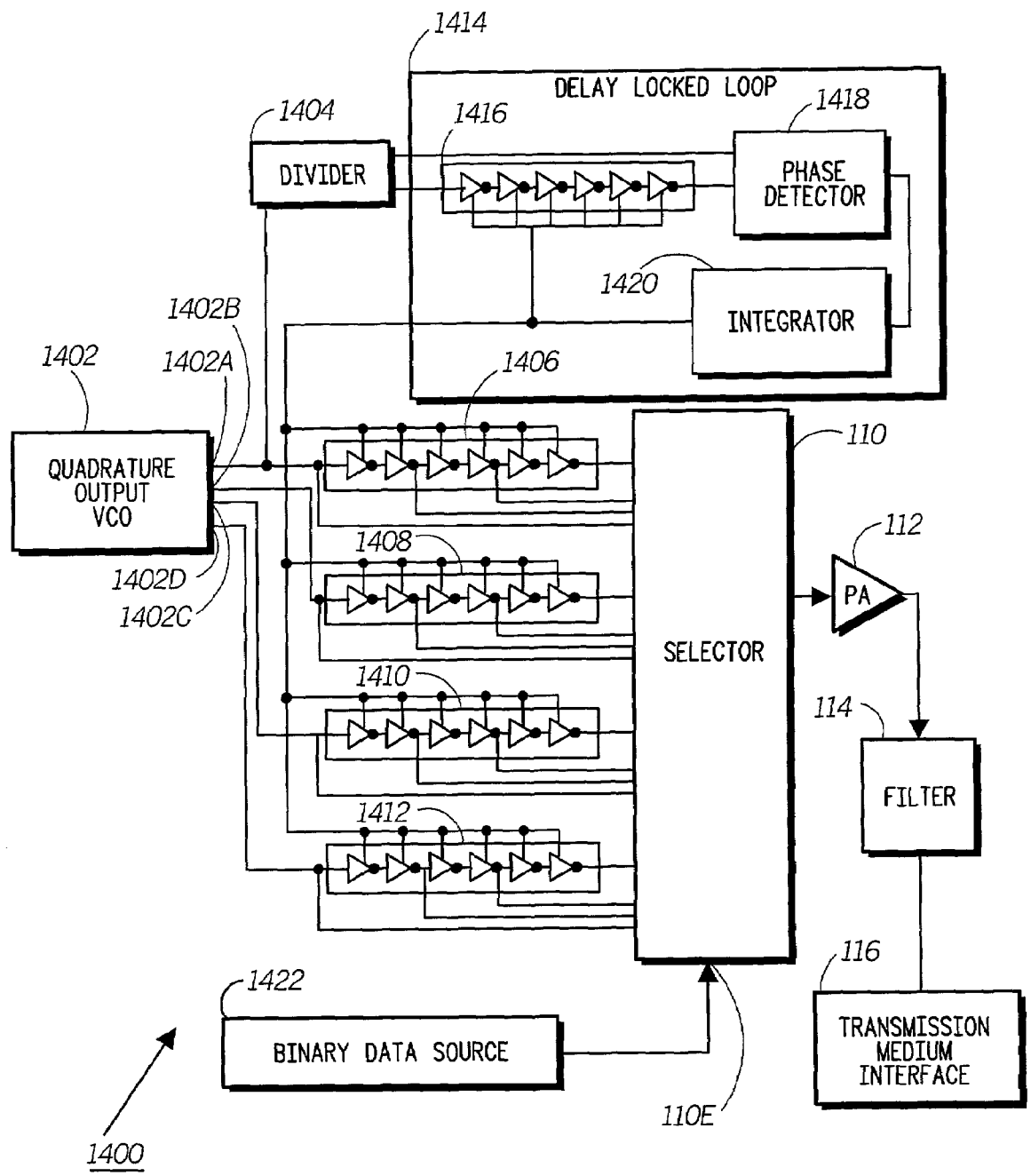
FIG. 14 is a functional block diagram of a phase shift key modulator according to a third alternative embodiment of the invention.

FIG. 14 is a functional block diagram of a phase shift key modulator 1400 according to a third alternative embodiment of the invention. The third alternative modulator 1400 shares many elements, as indicated by common reference numbers, with elements described above in connection with other embodiments of the invention. Instead of using the multiphase oscillator 108 as the source of phases of the carrier from which the selector 110 selects, the third alternative modulator 1400 uses a quadrature output voltage controlled oscillator (VCO) 1402 to supply four phases of the carrier signal to a first 1406, a second 1408, a third 1410 and a fourth 1412 regulated delay line. Each of the four regulated delay lines 1406, 1408, 1410, 1412 includes a plurality of taps (signal source outputs) from which versions of the carrier signal that are characterized by a plurality of delays are extracted. More specifically, a first output 1402A of the VCO 1402 is coupled to an input of the first regulated delay line 1406, a second output 1402B of the VCO 1402 is coupled to an input of the second regulated delay line 1408, a third output 1402C of the VCO 1402 is coupled to an input of the third regulated delay line 1410, and a fourth output 1402D of the VCO 1402 is coupled to an input of the fourth regulated delay line 1412. Thus whereas in modulators 100, 500, 1000 described above the mutiphase oscillator 108 serves as a multiphase signal source, in the embodiment shown in FIG.

14, the VCO 1402 in combination with the four regulated delay lines 1406, 1408, 1410, and 1412 serves as a multiphase signal source. The four outputs 1402A, 1402B, 1402C, 1402D of the VCO 1402 preferably output four phases of the carrier signal that are equally spaced about 2 Pi in phase.

Each of the regulated delay lines 1406, 1408, 1410, and 1412 is taped in four places, and includes two variable propagation delay inverters between each tap. The taps of the four regulated delay lines 1406, 1408, 1410, 1412 are coupled to signal inputs of the selector 110. Each of the variable propagation delay inverters in the four regulated delay lines 1406, 1408, 1410, 1412 includes a propagation delay control input that is controlled by a control signal output by a delay locked loop 1414.

The first output 1402A of the VCO 1402 is also coupled to an input of a frequency divider 1404. A first output of the frequency divider 1404 is coupled directly to a first input of a phase detector 1418 of a delay locked loop 1414. The delay locked loop 1414 also comprises a master delay line 1416, and a low pass filter integrator 1420. A second output of the frequency divider 1404 is coupled to an input of the master delay line 1416. The master delay line 1416 includes a series of variable propagation delay inverters. An output of the master delay line 1416 is coupled to a second input of a phase detector 1418. An output of the phase detector 1418 is coupled to the input of the low pass filter 1420. An output of the integrator 1420 is coupled to propagation delay control inputs of the series of variable propagation delay inverters that comprise the master delay line 1416, and also serves as the control signal that is used for controlling the inverter propagation delays in the four delay lines 1406, 1408, 1410, 1412. Thus the four delay lines 1406, 1408, 1410 and 1412 that are used to supply a plurality of phases of the carrier signal to selector 110 are controlled by the master delay locked loop 1414 so as to maintain predetermined phase relationships between the taps.

Preferably, the number of phases input into the selector 110, in the third alternative modulator 1400 is not divisible by the divisor associated with the frequency divider 1404. For example if as shown sixteen phases of the carrier signal are coupled from the four delay lines 1406, 1408, 1410, 1412, then the divider 1404 can for example divide by 3. In the case that the master delay line 1416 and the four delay lines 1406, 1408, 1410, 1412 are of the same design, the total phase delay across each of the four delay lines 1406, 1408, 1410, 1412 is equal to the product of the phase delay across the master delay line 1416 times the divisor. In an exemplary embodiment the phase detector 1418 is a Pi/4 phase detector, so that the total phase difference across the master delay line 1416 is Pi/4 radians and the total phase difference across each of the regulated delay lines 1406, 1408, 1410, 1412 is 3Pi/4 radians. Consequently the phase difference between successive taps of each of the regulated delay lines 1406, 1408, 1410, 1412 is 3Pi/16 radians. By ignoring phase differences of 2 Pi radians it is seen that all of the sixteen taps shown in FIG. 8 are obtained from the regulated delay lines 1406, 1408, 1410, and 1412. Had a division by two or four been performed by the divider 1404. All of the phases would not be obtained. Establishing a phase differences across successive taps in the regulated delay lines 1406, 1408, 1410, 1412 that is greater than the 2 Pi radians divided by the total number of taps, has the advantage that a higher frequency carrier signal can be processed with relatively low speed inverters.

A binary data source 1422 is coupled to one or more phase select inputs 110E of the selector 110. The third alternative modulator 1400 can operate more than one way. If, for example, sixteen distinct phases of the carrier signal are input from the four delay lines 1406, 1408, 1410, 1412, and each phase is to be used to represent a distinct information symbol (e.g., a four bit word), then the binary data source 1422 may be configured to supply four bits at a time to four phase select inputs 110E of the selector in order to specify one of the sixteen phases to be transmitted. In the latter configuration each of the sixteen possible bit patterns of a four bit word would be represented by one of the sixteen phases. Such a signal scheme be generalized, at least in so far as the number of bits per words is concerned, so that k bit long words are associated with one of $2_k$ phase of a carrier signal.

The third alternative modulator 1400 can also be operated in the manner, described above with reference to FIGS. 5-10, in which the second alternative modulator 500 (FIG. 5) is operated. In the latter case the binary data source 1422 preferably takes the form of the binary data source 102 (FIGS. 1, 5, 10) described above, and the phase sequencer 502 (FIGS. 5, 10) is preferably added between the binary data source 1422 and the selector 110.

The modulators described above can be fabricated using fabrications processes such as those used to make digital Complementary Metal Oxide Semiconductor (CMOS) circuits. Such processes are highly optimized. Devices made using CMOS fabrication processes are relatively inexpensive. Furthermore, CMOS circuits are relatively efficient in terms of power consumption. Low power consumption is particularly attractive for battery operated wireless devices.

Figure 15:
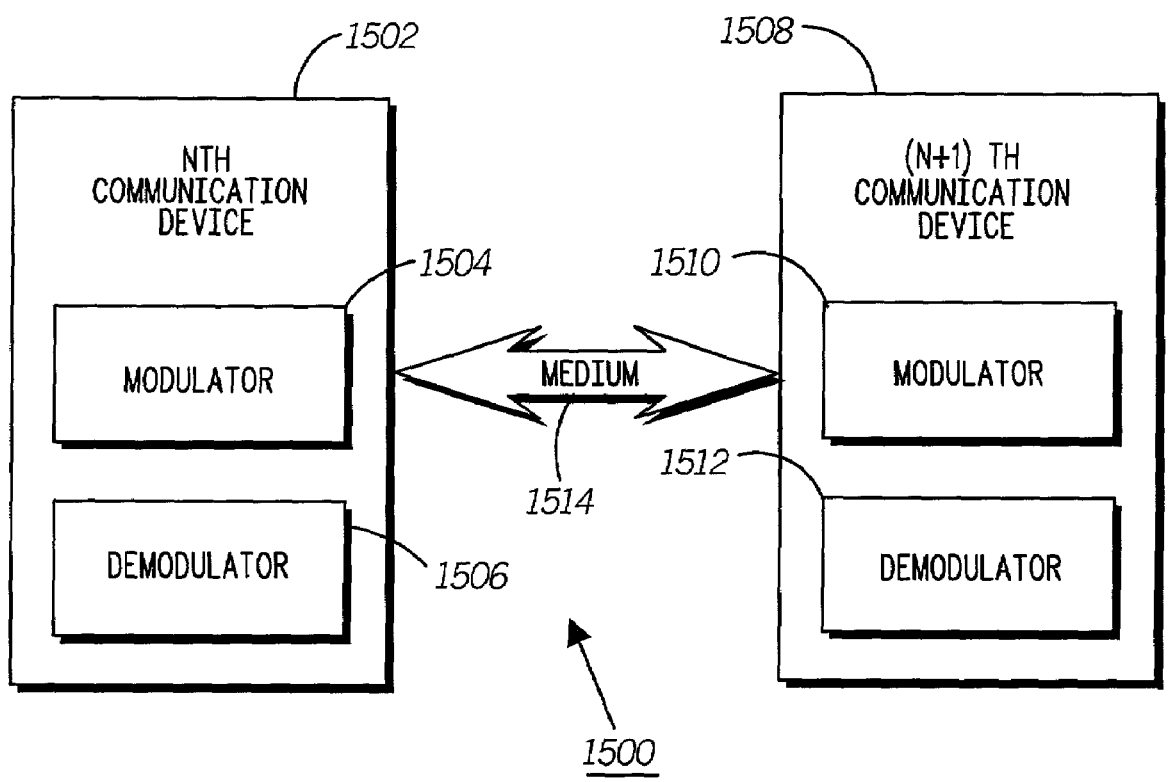
FIG. 15 is a function block diagram of a communication system in which the modulators shown in FIGS. 1, 5, 11 and 14 may be used.

FIG. 15 is a function block diagram of a communication system 1500 in which the modulators shown in FIGS. 1, 5, 11, 14 and 17 can be used. The system 1500 includes an Nth communication device and an N+1th communication device. The communication devices are coupled by a medium 1514 which preferably comprises free space. Other communication devices that are not shown can also be part of the communication system 1500. The Nth and N+1th communication devices are preferably wireless communication devices. The Nth and N+1th communication devices 1502, 1508 include modulators 1504, 1510. The modulators 1504, 1510 are of the types taught by the present invention. The communication devices 1502, 1508 further comprise demodulators 1506, 1508.

The design of the demodulators for use in combination with the modulators described is not the focus of the present invention. Such demodulators would normally include a first stage in which a received signal is mixed with in-phase and quadrature phase local oscillator signals followed by an intermediate to baseband demodulator.

Figure 16:
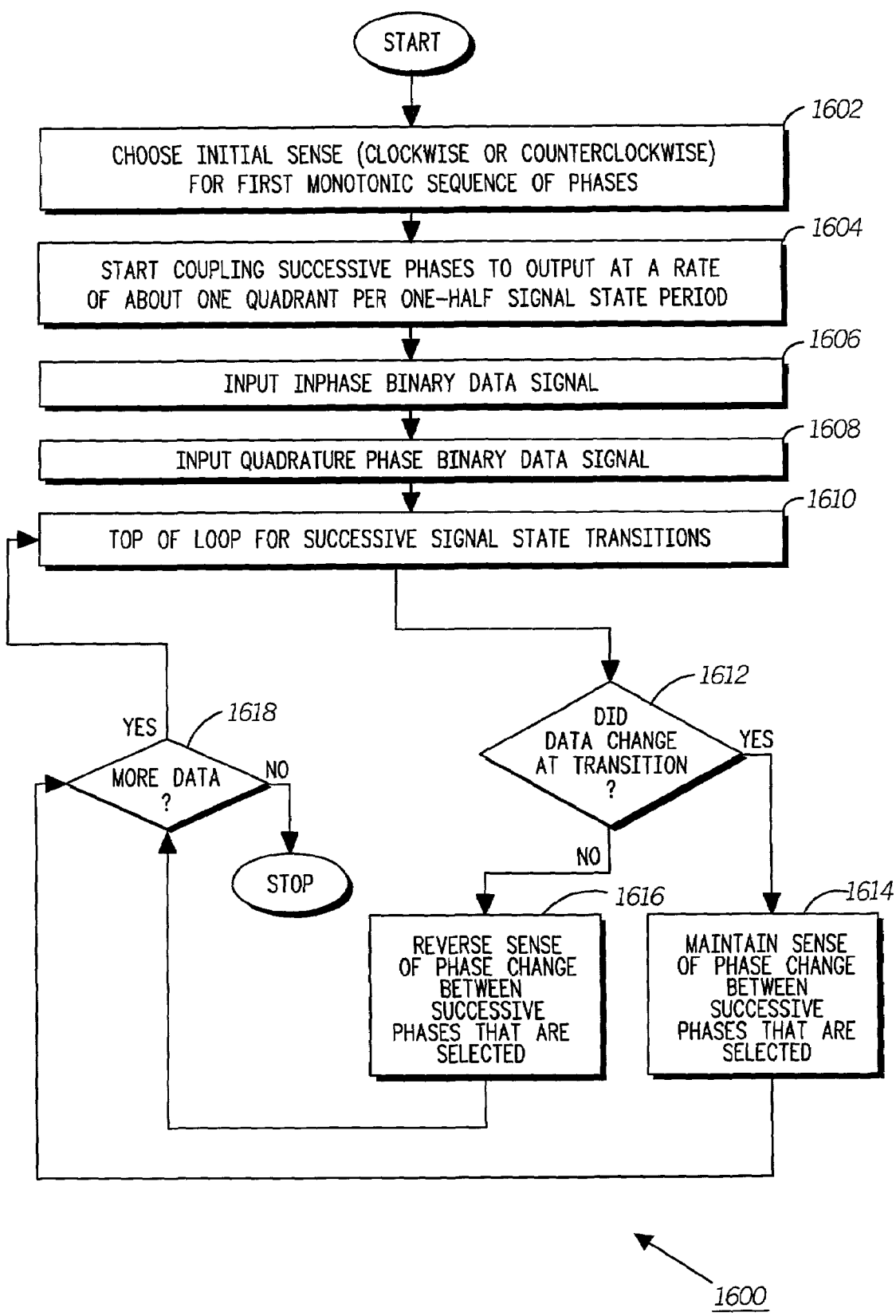
FIG. 16 is a flow diagram of a modulation method performed by the modulators shown in FIGS. 5 and 11 according to the preferred embodiment of the invention.
Figure 17:
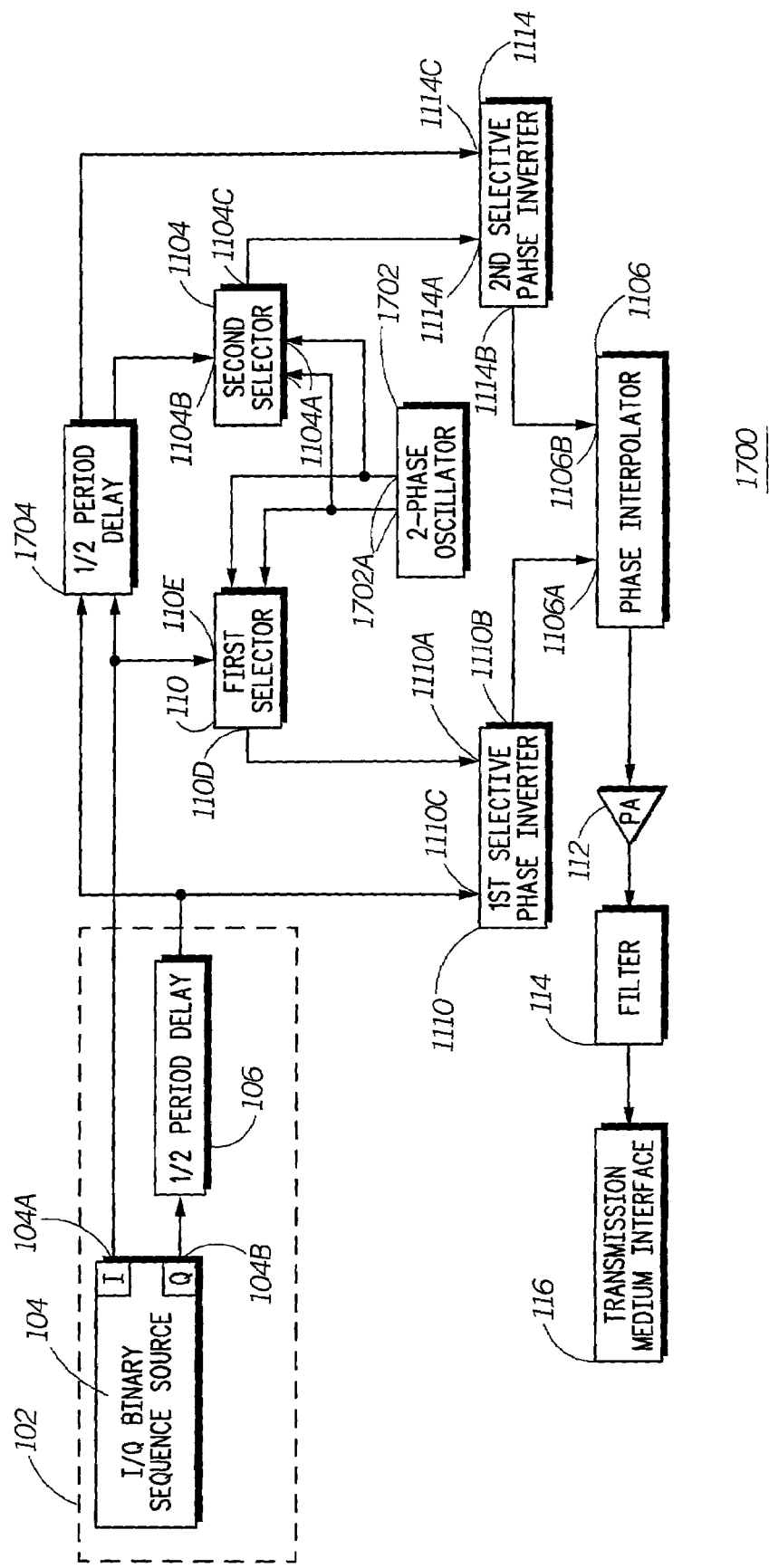
FIG. 17 is a functional block diagram of a phase shift key modulator according to a fourth alternative embodiment of the invention.

FIG. 16 is a flow diagram of a modulation method 1600 performed by the modulators shown in FIGS. 5, 11 and 17 according to the preferred embodiment of the invention. In step 1602 an initial phase direction (i.e., clockwise or counterclockwise for a starting monotonic sequence of phases is chosen. Either clockwise or counterclockwise can alternatively be chosen. In step 1604 coupling of successive phases at a rate of about one quadrant (Pi/4) per one-half signal state period is started. A sequence of at least two discrete phases is output per one-half signal state period. Phase are preferably coupled to the output one after another without intervening breaks. In step 1606 the in-phase channel binary data signal is input, and in step 1608 the quadrature channel binary data signal is input. Block 1610 is the top of a loop that processes successive potential signal state transitions in either channel. Due to the offset between the in-phase and quadrature phase channel the potential signal state transitions occur at one-half signal state period intervals. Block 1612 is a decision block the outcome of which depends on whether a signal value change occurred at the potential signal state transition. If so then as shown in block 1614, the previous phase direction (clockwise or counterclockwise) that characterizes the selection of successive phases of the carrier signal on a phasor diagram is maintained. If on the other hand no signal value change occurred, then as shown in block 1616, the phase direction that characterizes selection of successive phases is reversed. After block 1614 or 1616 another decision block 1618 is reached in which it is determined if there is more data to processed. If more data remains to be processed, the method loops back to block 1610 to consider subsequent potential signal state transitions. If on the other hand there is no more data to processed then the method 1600 terminates.

FIG. 17 is a functional block diagram of a phase shift key modulator 1700 according to a fourth alternative embodiment of the invention. The modulator 1700 shares a number of parts that are identified by common reference numerals with the modulators shown in FIGS. 1, 5 and 17. Those common parts are described above. The fourth alternative modulator 1700 can be understood as a modification of the preferred embodiment modulator 1100 that is altered by eliminating the phase sequencer 502. The phase interpolator 1106 is then wholly responsible for outputting a monotonic sequence of phases in response to each concurrent set of I and Q channel signal states, (i.e., for each one-half signal state period).

The embodiment shown in FIG. 17 does not use the phase sequencer 502 (FIGS. 5, 11). In the fourth alternative modulator, the multiphase oscillator 108 is replaced by a two phase oscillator 1702, that are includes two output taps 1702A that are spaced by about Pi/2 radians, for example at Pi/4 and 3Pi/4. The two output taps 1702A of the two phase oscillator 1702 are coupled to signal inputs 110A, 1104A of the first and second selectors 110, 1104.

The in phase channel output 104A of the binary sequence source is coupled through a second one half signal state period delay 1704 to a single phase select input 110E of the first selector 110 and to a single phase select input 1104B of the second selector. Note that in the embodiment shown in FIG. 17 the phase select inputs 110E, 1104B need only be one bit wide since one of only two phases are to be selected by the first and second selectors 110, 1104. The quadrature phase channel output 104B of the binary sequence source 104 is coupled through the one half signal state period delay 106 of binary data source 102, to the control signal input 1110C of the first selective phase inverter 1110. The quadrature phase channel output 104 is also coupled through the one half signal state period delay 106 of the binary data source 102, and through the second one half signal state period delay 1704 to the control signal input 1114C of the second selective phase inverter 1114. Data in the quadrature channel determines whether the phases output by the 2-phase oscillator are shifted by Pi radians (e.g., to 5/4 Pi and 7/4 Pi) or not. The XOR gates 1108, 1112 are not used in the embodiment shown in FIG. 17. Thus, by way of example, assuming a certain absolute phase, data from the quadrature phase channel output 104B is used to control whether a phase is selected in the upper or lower half of a phasor diagram such as and data in the from phase channel output 104A is used to control whether the phase selected is in the left or right hand side of the phasor diagram.

According to yet another alternative embodiment of the invention, the embodiment shown in FIG. 17 is modified by eliminating the first and second selective phase inverters 1110, 1114, providing a 4 phase oscillator in lieu of the two phase oscillator 1702, and using both outputs 104A, 104B with the ½ signal state period delay 106 retained to control phase selection by the first and second phase selectors 110, 1104.

Amplitude modulation is alternatively added to the modulators shown in FIGS. 1, 5, 11, 17 in order to make phase amplitude modulators.

Although for pedagogical reasons, the invention has been described with reference to block diagrams that include a plurality of separate blocks, it is to be understood that the invention is preferably implemented as one or more integrated circuits, in which multiple blocks of the block diagrams may be combined into one or more circuits. In such an integrated circuit implementation there may be no distinction or demarcation between circuits which embody the various functional blocks shown in the FIGS.

As will be apparent to those of ordinary skill in the pertinent arts, the invention may be implemented in hardware or software or a combination thereof. Programs embodying the invention or portions thereof may be stored on a variety of types of computer readable media including optical disks, hard disk drives, tapes, programmable read only memory chips. Network circuits may also serve temporarily as computer readable media from which programs taught by the present invention are read.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A modulator comprising: a multi phase signal source including: a plurality of signal source outputs for outputting a plurality of phases of a carrier signal; a first phase selector including: a plurality of signal inputs coupled to the plurality of signal source outputs of the multi phase signal source; a first selector output for selectively outputting a first sequence of selected phases of the carrier signal; a second phase selector including: a plurality of signal inputs coupled to the plurality of signal source outputs of the multi phase signal source; a second selector output for selectively outputting a second sequence of selected phases of the carrier signal; a summer including: a first input coupled to the first selector output; a second input coupled to the second selector output; an output for outputting, in response to a signal received from the first selector and a signal concurrently received from the second selector, at least one weighted sum of the signal received from the first selector and the signal received from the second selector.

2. The modulator according to claim 1 further comprising: a binary data source including: one or more binary data outputs for supplying binary data; a delay including: one or more inputs coupled to at least a subset of the one or more binary data outputs of the binary data source; and one or more of outputs for outputting delayed binary data; and wherein: the first phase selector further comprises: one or more phase select inputs coupled to at least a subset of the one or more binary data outputs of the binary data source; and the second selector further comprises one or more phase select inputs coupled to at least a subset of the one or more outputs of the delay.

3. A method of producing phase modulated signals, the method comprising the steps of:
produce a plurality of discrete phases of a carrier signal;
inputting a first binary data signal that is characterized by a signal state period; inputting a second binary data signal that is characterized by the signal state period and is offset in time from the first binary data signal by about one-half of the signal state period; and coupling a sequence of discrete phases that includes two or more of the plurality of discrete phases of the carrier signal to an output in response to each concurrent set of states of the one or more binary data signals, comprising for each one-half signal state period outputting a monotonic sequence of discrete phases at a rate of about one quadrant per one-half signal state period;

at intervals of one-half the signal state period, at each potential signal state transition of the first and second binary data signal: in the case that a signal state transition occurs maintaining a phase direction that characterizes selections of successive phases; and in that case that a signal state transition does not occur reversing the phase direction that characterizes selections of successive phases.

4. The method according to claim 3 wherein phases are output of a rate of at least about eight phases per signal state period.

5. A modulator comprising:

a multi phase signal source including a plurality of signal source outputs for outputting a plurality of phases of a carrier signal;

a selector including:
  a plurality of selector inputs coupled to the plurality of signal source outputs for receiving the plurality of phases of the carrier signal;
  an output for selectively outputting a selected phase of the carrier signal; and
  one or more select inputs for receiving binary data for specifying the selected phase; and a binary data source coupled to the one or more select inputs for supplying the binary data, wherein the binary data source comprises: an I and Q channel binary sequence source including: a first channel output coupled to a first select input of the one or more select inputs; and a second channel output coupled to a second select input of the one or more select inputs, wherein: the binary data is supplied at a predetermined rate that is characterized by a signal state period; and the binary data source further comprises a one half signal state period delay intervening between the first channel output and the first select input.

* * * * *

UNITED STATES PATENT AND TRADEMARK OFFICE
CERTIFICATE OF CORRECTION

PATENT NO. : 7,409,012 B2
APPLICATION NO. : 10/172566
DATED : August 5, 2008
INVENTOR(S) : Frederick L. Martin et al.

It is certified that error appears in the above-identified patent and that said Letters Patent is hereby corrected as shown below:

IN THE SPECIFICATION

In Column 5, Line 3, delete "$2_K$" and insert -- $2^k$ --, therefor.

In Column 5, Line 30, delete "280." and insert -- $2\delta\Phi$. --, therefor.

In Column 18, Line 11, delete "$2_k$" and insert -- $2^k$ --, therefor.

Signed and Sealed this

Eleventh Day of August, 2009

David J. Kappos
*Director of the United States Patent and Trademark Office*